(12) United States Patent
Kurian

(10) Patent No.: US 10,474,800 B2
(45) Date of Patent: Nov. 12, 2019

(54) GENERATING ALERTS BASED ON VEHICLE SYSTEM PRIVACY MODE

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 430 days.

(21) Appl. No.: 15/353,718

(22) Filed: Nov. 16, 2016

(65) Prior Publication Data

US 2018/0137264 A1    May 17, 2018

(51) Int. Cl.

| | |
|---|---|
| *G06F 21/32* | (2013.01) |
| *H04L 29/06* | (2006.01) |
| *H04L 29/08* | (2006.01) |
| *B60R 25/31* | (2013.01) |
| *H04W 12/02* | (2009.01) |
| *H04W 12/08* | (2009.01) |
| *H04W 4/44* | (2018.01) |
| *G06F 21/62* | (2013.01) |
| *H04W 4/021* | (2018.01) |
| *G10L 17/00* | (2013.01) |
| *H04W 4/80* | (2018.01) |

(52) U.S. Cl.
CPC .......... *G06F 21/32* (2013.01); *G06F 21/6245* (2013.01); *H04L 63/0428* (2013.01); *H04L 63/102* (2013.01); *H04L 67/12* (2013.01); *H04L 67/303* (2013.01); *H04W 4/022* (2013.01); *H04W 4/44* (2018.02); *H04W 12/02* (2013.01); *H04W 12/08* (2013.01); *G10L 17/005* (2013.01); *H04L 65/1069* (2013.01); *H04W 4/80* (2018.02)

(58) Field of Classification Search
CPC ............... H04L 63/0428; H04L 63/102; H04L 65/1069; H04L 67/12; H04L 67/303; H04W 4/022; H04W 4/44; H04W 4/80; H04W 12/02; H04W 12/08; G06F 21/32; G06F 21/6245; G10L 17/005
See application file for complete search history.

(56) References Cited

U.S. PATENT DOCUMENTS

| | | |
|---|---|---|
| 7,508,300 B2 | 3/2009 | Mock et al. |
| 8,428,973 B1 | 4/2013 | Hopkins, III |
| 8,781,838 B2 | 7/2014 | Krause |
| 8,825,115 B2 | 9/2014 | Highstrom et al. |

(Continued)

OTHER PUBLICATIONS

Nov. 16, 2018 U.S. Non-final Office Action—U.S. Appl. No. 15/353,703.
U.S. Appl. No. 15/353,703, filed Nov. 16, 2016.

*Primary Examiner* — Joseph P Hirl
*Assistant Examiner* — Thomas A Gyorfi
(74) *Attorney, Agent, or Firm* — Banner & Witcoff, Ltd.; Michael A. Springs

(57) ABSTRACT

A vehicle computing platform may receive driver sensor data indicating whether a driver seat in a vehicle is occupied. The vehicle computing platform may determine, based on the driver sensor data, an identity of a driver of the vehicle. The vehicle computing platform may receive passenger sensor data indicating whether a passenger seat in the vehicle is occupied. The vehicle computing platform may, based on the passenger sensor data indicating that the passenger seat in the vehicle is occupied, obscure information on a screen of the vehicle.

20 Claims, 20 Drawing Sheets

(56) References Cited

U.S. PATENT DOCUMENTS

| | | |
|---|---|---|
| 8,989,820 B2 | 3/2015 | Czaja et al. |
| 9,055,509 B2 | 6/2015 | Macek et al. |
| 9,167,418 B1 | 10/2015 | Tuluca |
| 9,180,449 B2 | 11/2015 | Duncan et al. |
| 9,381,813 B2 | 7/2016 | Hampiholi et al. |
| 2001/0013825 A1 | 8/2001 | DeLine et al. |
| 2003/0152088 A1 | 8/2003 | Kominami et al. |
| 2005/0001714 A1 | 1/2005 | Amari |
| 2007/0182536 A1 | 8/2007 | Prywes |
| 2010/0330975 A1* | 12/2010 | Basir ............... H04L 67/12 455/418 |
| 2011/0254863 A1 | 10/2011 | Hoshino |
| 2012/0035923 A1 | 2/2012 | Krause |
| 2012/0122525 A1 | 5/2012 | Miller et al. |
| 2013/0024060 A1 | 1/2013 | Sukkarie et al. |
| 2013/0038437 A1 | 2/2013 | Talati et al. |
| 2013/0096771 A1 | 4/2013 | Srenger |
| 2013/0200991 A1 | 8/2013 | Ricci et al. |
| 2013/0274998 A1 | 10/2013 | Kato et al. |
| 2015/0052619 A1* | 2/2015 | Kwak ............... G06F 21/6245 726/28 |
| 2015/0057997 A1 | 2/2015 | Quast et al. |
| 2015/0126143 A1 | 5/2015 | Van Wiemeersch et al. |
| 2016/0070344 A1 | 3/2016 | Gohl |
| 2016/0086397 A1 | 3/2016 | Phillips |
| 2016/0105775 A1* | 4/2016 | Azmat ............... H04W 4/08 455/518 |
| 2016/0119782 A1 | 4/2016 | Kim |
| 2016/0328081 A1 | 11/2016 | Vilermo et al. |
| 2016/0352712 A1* | 12/2016 | Tamp ............... H04W 4/44 |
| 2017/0057492 A1 | 3/2017 | Edgington et al. |
| 2017/0126680 A1* | 5/2017 | Yusuf ............... H04W 12/02 |
| 2017/0185362 A1 | 6/2017 | Cansino et al. |
| 2017/0244998 A1 | 8/2017 | Shaw et al. |
| 2017/0308689 A1 | 10/2017 | Boesen |
| 2017/0316533 A1 | 11/2017 | Goldman-Shenhar et al. |
| 2017/0349184 A1 | 12/2017 | Tzirkel-Hancock et al. |
| 2018/0025553 A1 | 1/2018 | Bajwa et al. |
| 2018/0088661 A1 | 3/2018 | Betancourt |
| 2018/0124233 A1 | 5/2018 | Abramson et al. |
| 2018/0154903 A1 | 6/2018 | Song |

\* cited by examiner

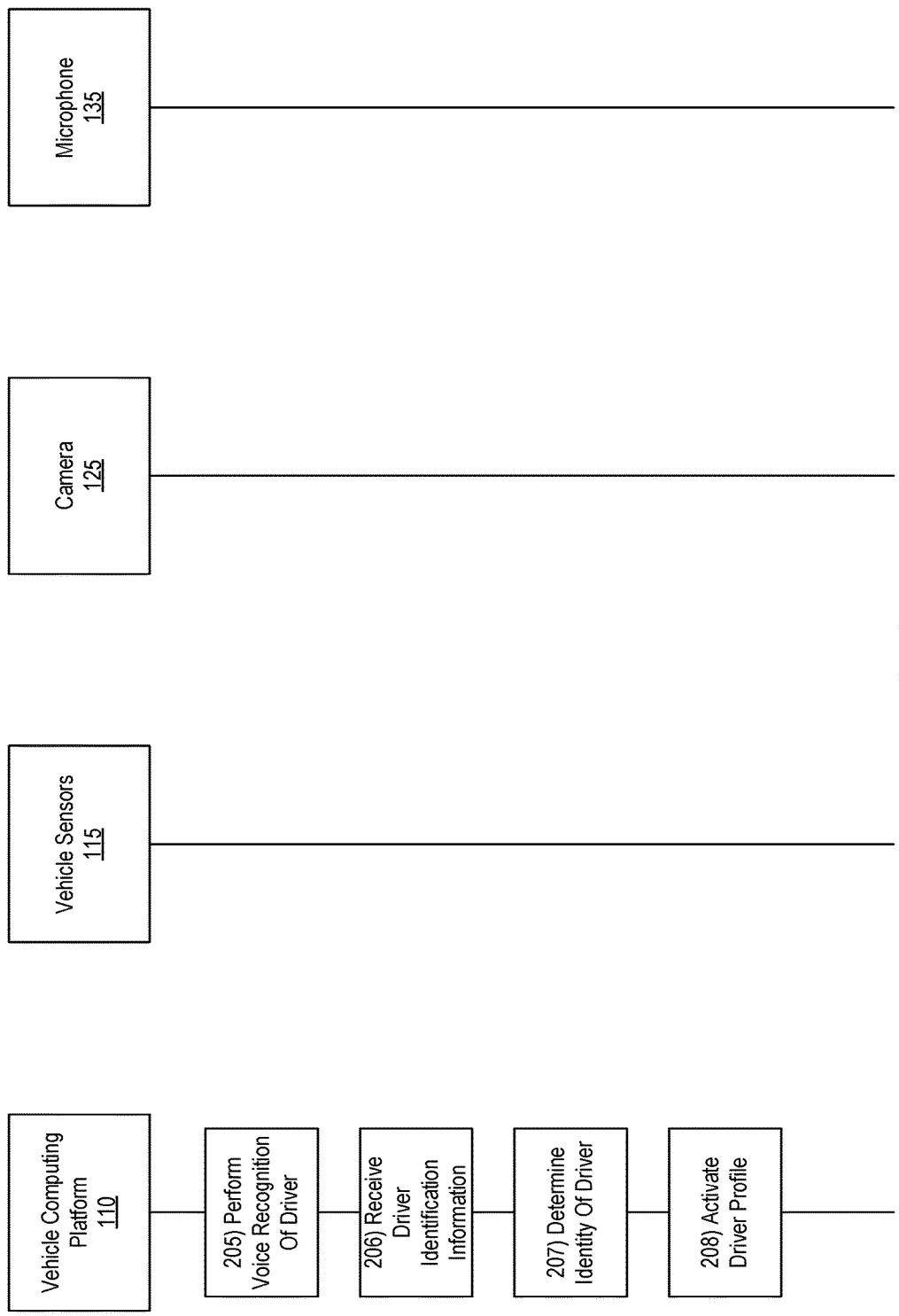

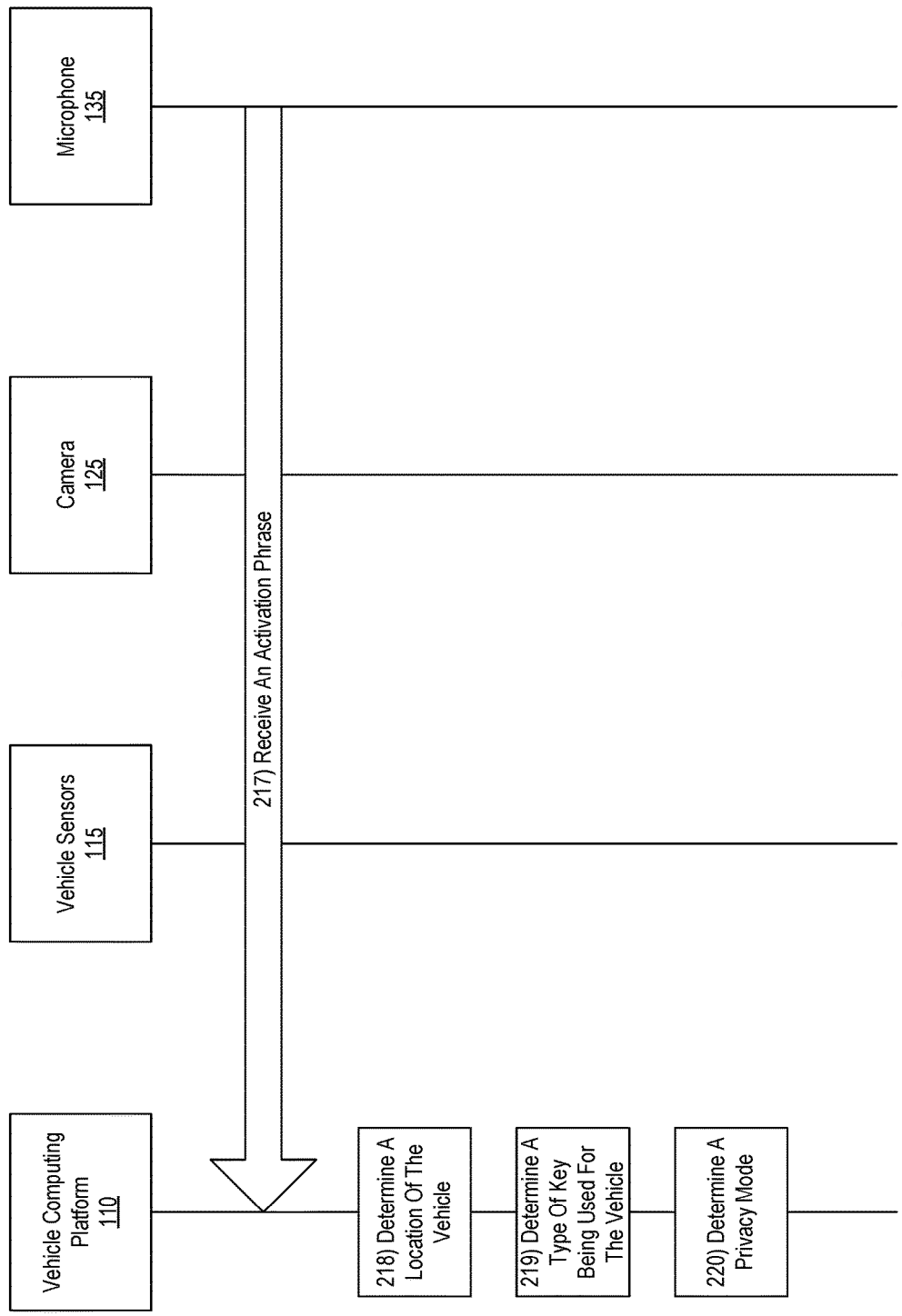

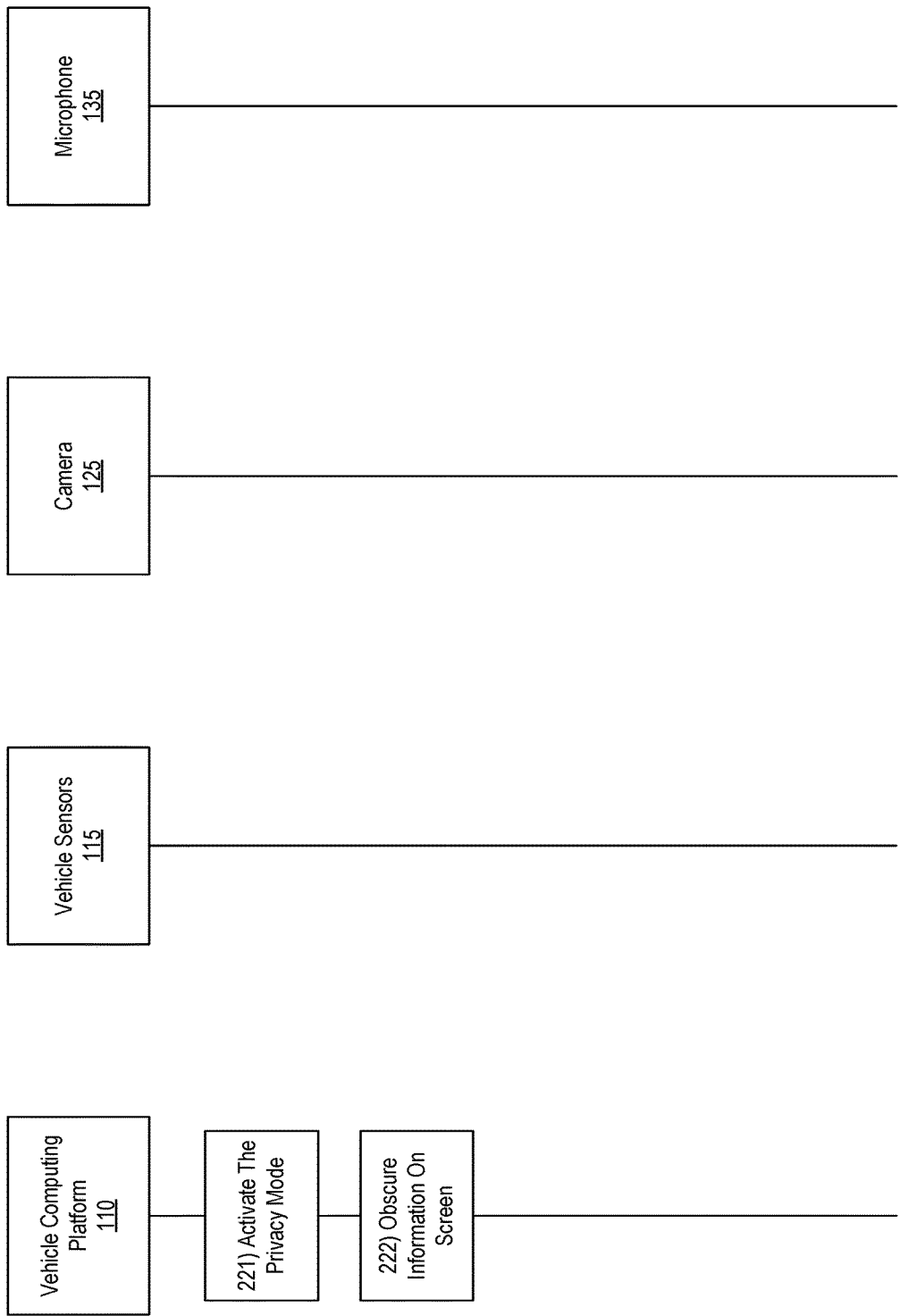

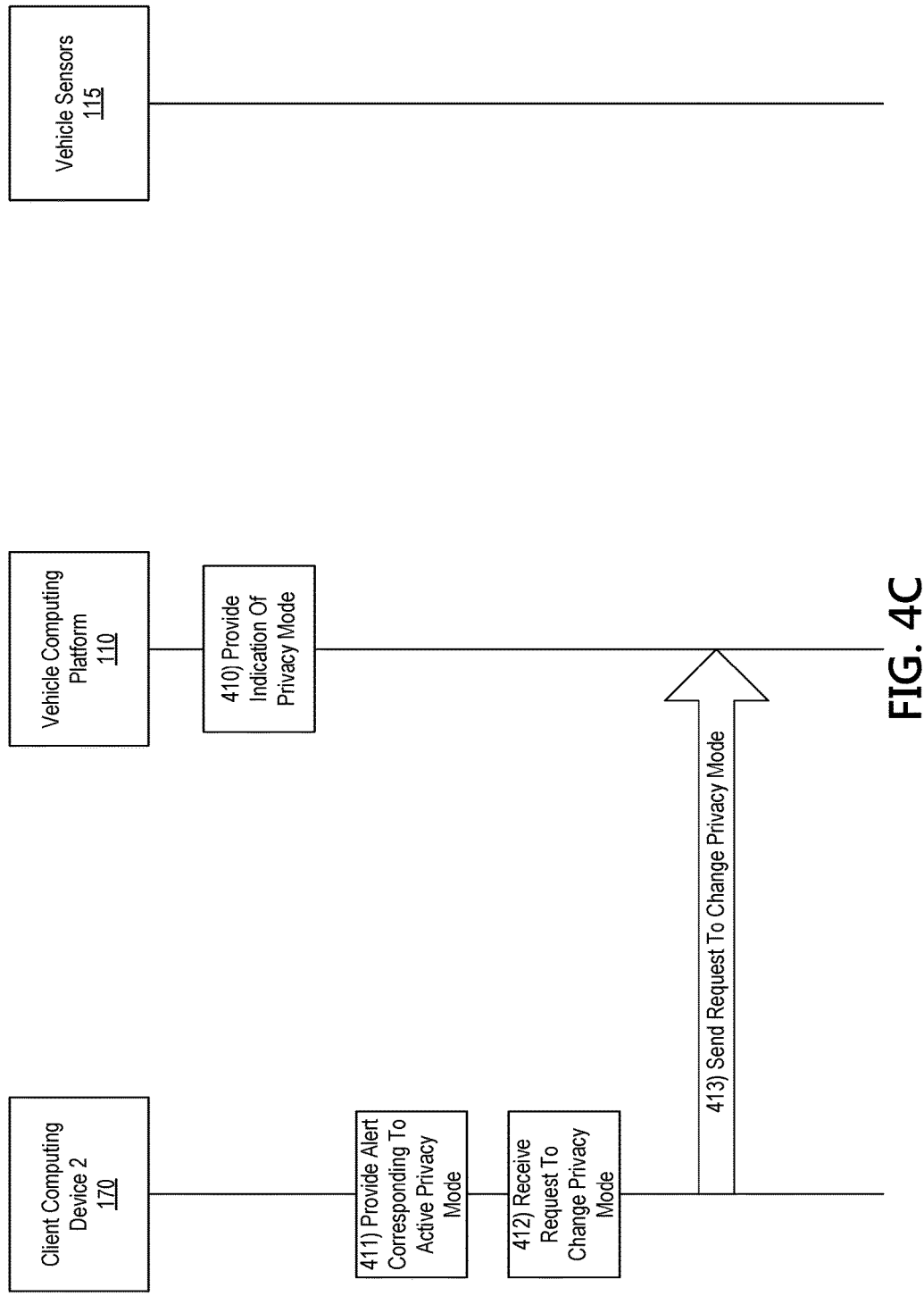

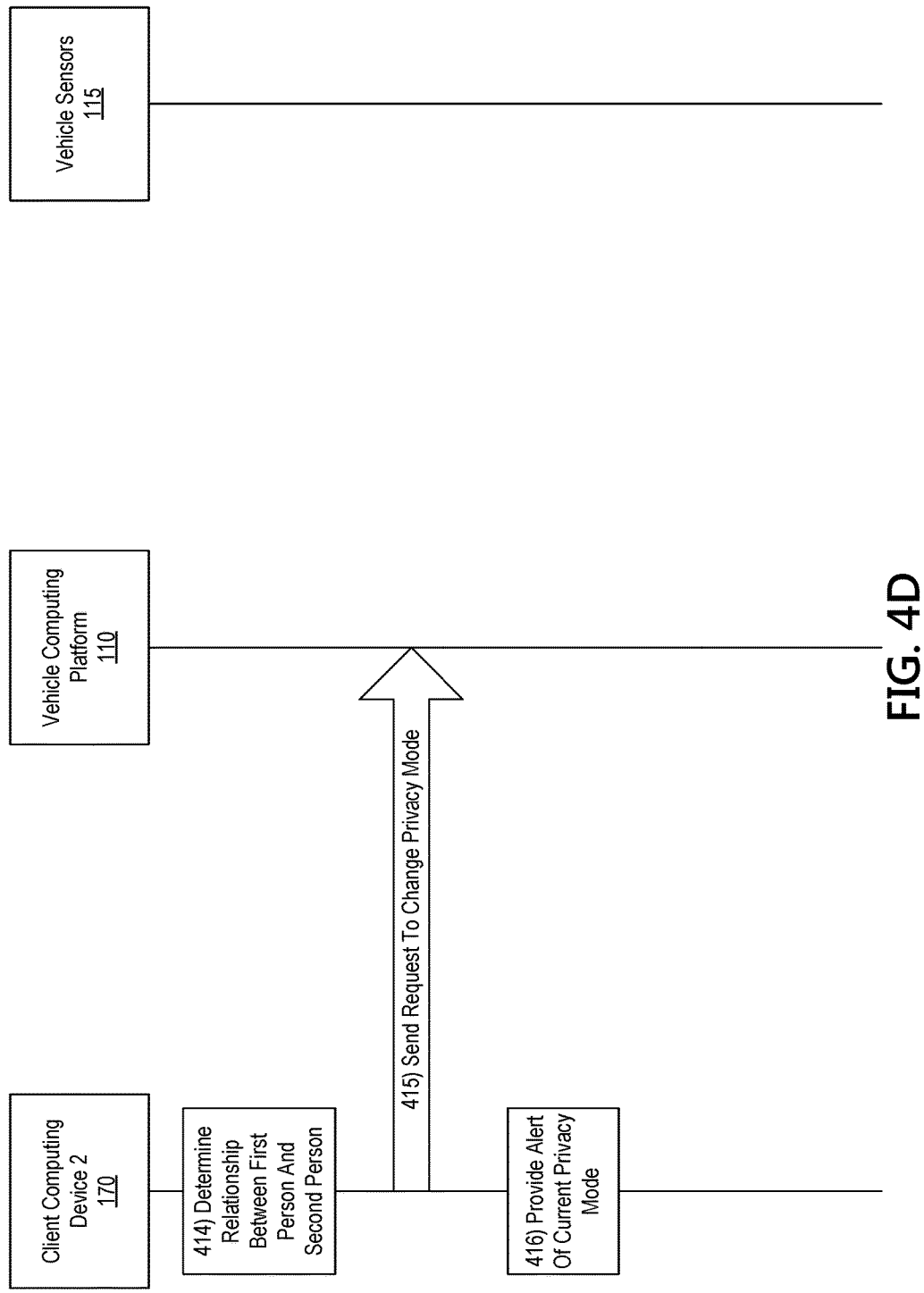

GENERATING ALERTS BASED ON VEHICLE SYSTEM PRIVACY MODE

BACKGROUND

Aspects of the disclosure relate to providing information security and preventing unauthorized access to resources of an information system. In particular, one or more aspects of the disclosure relate to preventing unauthorized access to secured information using identification techniques.

As vehicles and devices increasingly provide audio or visual displays for various users to access, view, and/or modify information, including client information, ensuring the safety and security of information made available is increasingly important. In many instances, however, it may be difficult to ensure the safety and security of such information while also optimizing the efficient and effective technical operations of the computer systems, vehicles, and/or devices that maintain and/or provide such information.

SUMMARY

Aspects of the disclosure provide effective, efficient, scalable, and convenient technical solutions that address and overcome the technical problems associated with providing information and preventing unauthorized access to information resources by implementing identification techniques, as well as information-obscuring techniques.

In accordance with one or more embodiments, a computing platform having at least one processor and a memory may receive driver sensor data indicating whether a driver seat in a vehicle is occupied. The computing platform may determine, based on the driver sensor data, an identity of a driver of the vehicle. The computing platform may receive passenger sensor data indicating whether a passenger seat in the vehicle is occupied. The computing platform may, based on the passenger sensor data indicating that the passenger seat in the vehicle is occupied, obscure information on a screen of the vehicle.

In some embodiments, the information on the screen of the vehicle is information associated with a driver of the vehicle. In some embodiments, the information on the screen of the vehicle is one of a text message to the driver of the vehicle, a voicemail to the driver of the vehicle, or a call history of the driver of the vehicle.

In some embodiments, based on the driver sensor data indicating that the driver seat in the vehicle is not occupied, and the passenger sensor data indicating that the passenger seat in the vehicle is occupied, the computing platform may deactivate the screen of the vehicle. In some embodiments, the computing platform may receive driver identification information, and activate a driver profile based on the identity of the driver of the vehicle.

In some embodiments, the computing platform may receive passenger identification information. The computing platform may determine an identity of a passenger of the vehicle based on the passenger identification information. The computing platform may determine the information to be obscured based on the identity of the passenger.

In some embodiments, the computing platform may receive, from a camera, at least one image of the passenger of the vehicle. The passenger identification information may include the at least one image of the passenger of the vehicle. Furthermore, determining the identity of the passenger of the vehicle may include performing face recognition of the at least one image of the passenger of the vehicle to determine the identity of the passenger.

In some embodiments, the computing platform may receive, from a microphone, audio that includes speech spoken by the passenger of the vehicle. The passenger identification information may include the audio. Furthermore, determining the identity of the passenger of the vehicle may include performing voice recognition of the audio to determine the identity of the passenger.

In some embodiments, the computing platform may, based on the identity of the passenger of the vehicle, determine a privacy mode of a plurality of privacy modes. The computing platform may activate the privacy mode. The computing platform may determine, based on the privacy mode, the information to be obscured.

In some embodiments, the computing platform may, in a case that a first privacy mode of the plurality of privacy modes is activated, apply a first privacy setting to a first application of the vehicle, and apply a second privacy setting to a second application of the vehicle. In some embodiments, the computing platform may, in a case that a second privacy mode of the plurality of privacy modes is activated, apply a third privacy setting to the first application, the third privacy setting being different from the first privacy setting, and apply a fourth privacy setting to the second application, the fourth privacy setting being different from the second privacy setting.

In some embodiments, the computing platform may determine a location of the vehicle. In some embodiments, the computing platform may select the information to be obscured based on the location of the vehicle.

In some embodiments, determining a location of the vehicle may include determining that the location of the vehicle indicates that the vehicle is within a predetermined geo-fence of a plurality of predetermined geo-fences. In some embodiments, selecting the information to be obscured based on the location of the vehicle may include determining whether a profile associated with the predetermined geo-fence indicates that the information is to be obscured.

In some embodiments, the computing platform may determine a type of key being used for the vehicle. The obscured information may include first information in a case of a first type of key being used for the vehicle. The obscured information may include second information different from the first information in a case of a second type of key being used for the vehicle. In some embodiments, the first type of key may be a standard key. In some embodiments, the second type of key may be a limited-use key.

In some embodiments, the computing platform may receive, from a user device associated with a driver of the vehicle, a privacy profile for the vehicle. In some embodiments, the computing platform may determine the information to be obscured based on the privacy profile for the vehicle. In some embodiments, the privacy profile for the vehicle may be associated with a type of the vehicle.

In some embodiments, the computing platform may receive, via a microphone of the vehicle, an activation phrase. The computing platform may determine that the activation phrase corresponds to a privacy mode of a plurality of privacy modes. The computing platform may activate the privacy mode. The activation phrase may be a distress phrase. The privacy mode may be a distress mode.

In accordance with one or more embodiments, a computing platform having at least one processor and a memory may determine a privacy mode of a vehicle, the privacy mode based on a first identity of the first vehicle occupant and a second identity of a second vehicle occupant. The computing platform may receive a request to initiate a communication between the computing platform and a device outside the vehicle. The computing platform may, before initiating the communication, provide a notification to the device outside the vehicle of a status of the privacy mode of the vehicle.

In some embodiments, receiving the request to initiate the communication between the computing platform and the device outside the vehicle may include receiving a request to initiate a telephone call from the device outside the vehicle. In some embodiments, receiving the request to initiate the telephone call from the device outside the vehicle may include receiving the telephone call from the device outside the vehicle.

In some embodiments, providing the notification to the device outside the vehicle of the status of the privacy mode of the vehicle may include providing an audio notification to a caller from the device outside the vehicle. The audio notification may include the status of the privacy mode of the vehicle.

In some embodiments, the computing platform may provide notification of the first identity of the first vehicle occupant and the second identity of the second vehicle occupant. In some embodiments, the computing platform may receive information regarding an third identity of a user of the device outside the vehicle. In some embodiments, the computing platform may, based on the first identity of the first vehicle occupant, the second identity of the second vehicle occupant, and the third identity of the user of the device outside the vehicle, encrypt the telephone call. In some embodiments, the computing platform may provide a notification that the telephone call is encrypted.

In some embodiments, the privacy mode of the vehicle may be a first privacy mode during a first time of day, and the privacy mode of the vehicle may be a second privacy mode during a second time of the day. The second privacy mode may be different from the first privacy mode. For example, a co-worker privacy mode may be activated during work hours on weekdays, while a family privacy mode may be activated on nights and weekends.

In accordance with one or more embodiments, a computing platform having at least one processor and a memory may determine a first privacy mode of a vehicle, the first privacy mode based on a first identity of the first vehicle occupant. The computing platform may provide a first notification of the first privacy mode of the vehicle. The computing platform may receive notification of an entry of a second vehicle occupant to the vehicle. The computing platform may receive information regarding a second identity of the second vehicle occupant. The computing platform may determine a second privacy mode of the vehicle, the second privacy mode based on the first identity of the first vehicle occupant and the second identity of the second vehicle occupant, the second privacy mode different from the first privacy mode. The computing platform may provide a second notification of the second privacy mode of the vehicle.

In some embodiments, providing the first notification of the first privacy mode of the vehicle may include providing a first vibration alert that corresponds to the second privacy mode of the vehicle. In some embodiments, providing the second notification of the second privacy mode of the vehicle may include providing a second vibration alert that corresponds to the second privacy mode of the vehicle, the second vibration alert different from the first vibration alert.

In some embodiments, the computing platform may cause, via a display of the computing platform, a visual indication of a current privacy mode of the vehicle. In some embodiments, the visual indication of the current privacy mode of the vehicle may include a blinking indication corresponding to the current privacy mode of the vehicle.

In some embodiments, the computing platform may receive input corresponding to a request to change the current privacy mode of the vehicle to a different privacy mode of the vehicle. In some embodiments, the computing platform may send, to the vehicle, the request to change the current privacy mode of the vehicle to the different privacy mode. In some embodiments, receiving the input corresponding to the request to change the current privacy mode of the vehicle to the different privacy mode of the vehicle may include receiving, via a touch-screen interface, a tap input corresponding to the request to change the current privacy mode of the vehicle to the different privacy mode of the vehicle.

In some embodiments, the computing platform may activate a first mode of the computing platform based on the second vehicle occupant having a first relationship with respect to the first vehicle occupant. In some embodiments, the computing platform may activate a second mode of the computing platform based on the second vehicle occupant having a second relationship with respect to the first vehicle occupant, the second mode of the computing platform different from the first mode of the computing platform.

In some embodiments, the computing platform may, if the first mode of the computing platform is active, provide a first type of alert corresponding to the current privacy mode of the vehicle. In some embodiments, the computing platform may, if the second mode of the computing platform is active, provide a second type of alert corresponding to the current privacy mode of the vehicle, the second type of alert different from the first type of alert.

In some embodiments, the computing platform may be part of a watch. In some embodiments, the watch may be configured to communicate wirelessly with the vehicle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for preventing unauthorized access to secured information using identification techniques in accordance with one or more example embodiments;

FIGS. 4A-4D depict an illustrative event sequence for preventing unauthorized access to secured information using identification techniques in accordance with one or more example embodiments;

DETAILED DESCRIPTION

Figure 1A:
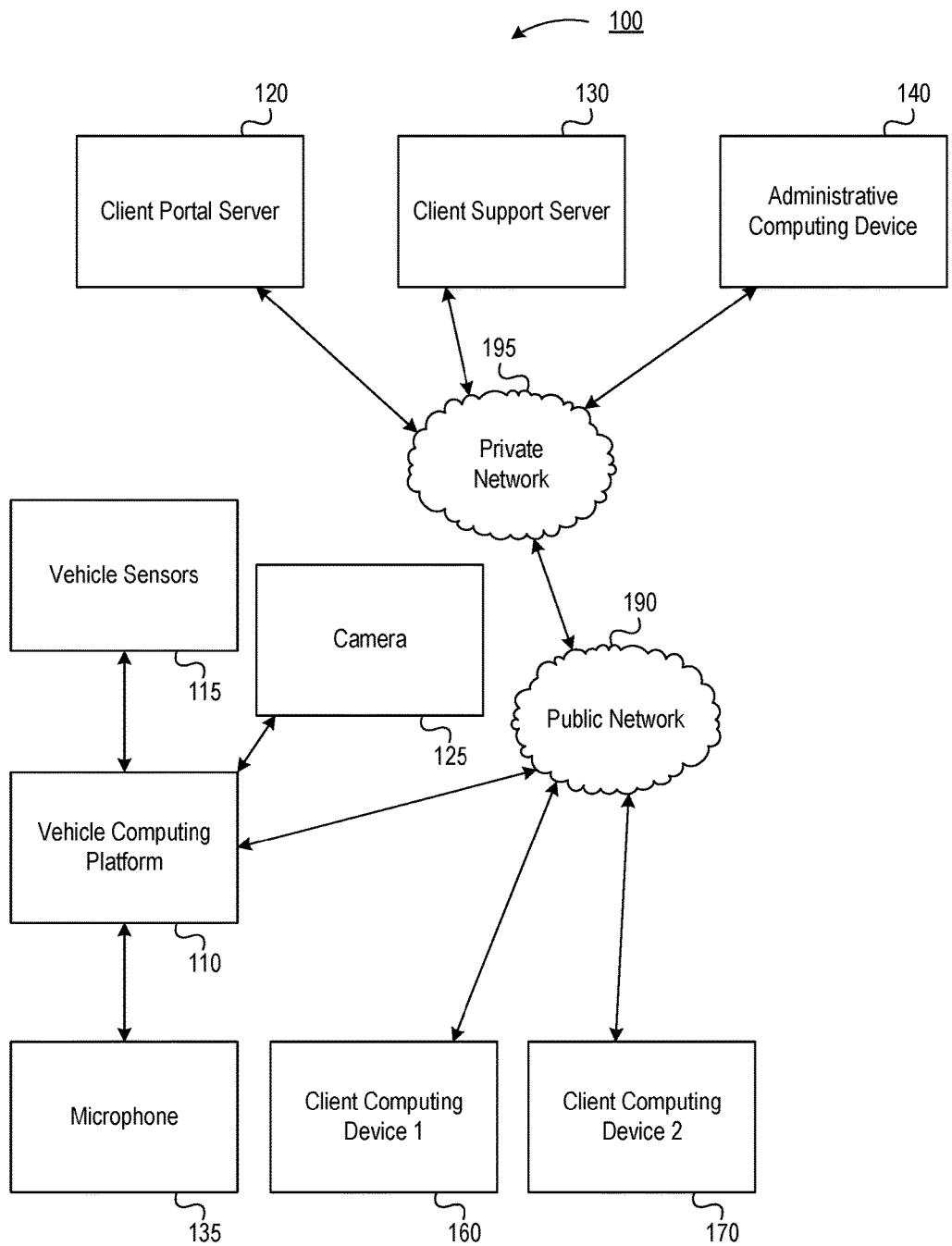
FIGS. 1A and 1B depict an illustrative computing environment for preventing unauthorized access to secured information using identification techniques in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a system that may provide one or more privacy modes for a webpage, application, vehicle display, or the like. The privacy modes may include multiple different views or modes. For example, a private mode (e.g., home, phone, and the like), a public-area mode (e.g., automated-teller machine (ATM), and the like), and/or a semi-private mode (e.g., vehicle dashboard with other passengers, and the like).

A privacy mode may include a view that can limit what is displayed on a viewable screen. One example of a view may include a private view, which may be a view that shows all accounts and details. Another example of a view may include a semi-public view, which may be a view that shows some account information, but hides other account information (e.g., balance information). For example, the system might only show basic information. A further example of a view may include a public view, which may be a view that shows minimal information that might only allow a particular transaction (e.g., a withdrawal).

A user may select a view type at login. The user may predefine a particular view to be a default view, which may be selected if another view type is not selected, for example, at login. A view may be set based on a location. For example, a home view may be private.

A vehicle's in-dash screen may automatically change to a particular view (e.g., semi-public view) if the vehicle detects other passengers in the vehicle. Similarly, the vehicle may select a particular view based on an identity of the other passengers in the vehicle (e.g., a spouse of a driver may trigger a different view than a co-worker of the driver).

The system may include a removable device that may interface with a vehicle via, for example, an audiovisual port, an onboard diagnostic system (OBD) port, another port, BLUETOOTH, WIFI, a hotspot, or the like. Alternatively or additionally, one or more features may be included in an in-dash system, as a component upgrade, software upgrade, or the like. Alternatively or additionally, one or more features may be included in an application on a remote device, such as a mobile device, tablet, laptop, or the like. One or more features may utilize a mobile device camera and/or other input sensor to improve quality of the data received by the system.

One or more privacy modes may be established to information that is provided through a system (e.g., via a screen, an audio system, or the like). Different mode views may be configured, defined, and/or saved. Some modes may be default modes that may be included with the system (e.g., public, private, family, and the like). For example, a private mode may be used for information relating to financial transactions, work, company chat, and the like. In another example, a public mode may be used for information relating to social media, non-private data, and the like. In a further example, a family mode may be used when only family members are in a vehicle. A certain mode may be a default mode, used when another mode is not active (e.g., public mode may be the default mode).

In some embodiments, the system may perform text-to-speech and/or speech-to-text translation to identify keywords, private data elements, or the like. For example, the system may support information relay via side viewing. For example, in some embodiments, when the system is in a particular privacy mode, some or all information may be displayed on an alternate screen or display than a screen or display that might be used in a different privacy mode. For example, in a private mode (e.g., a mode that may be active when a user is alone using the system—e.g., a driver is in a vehicle with no passengers), a main screen or display may be used. But in a different privacy mode (e.g., a public privacy mode, which may be active when a stranger is in the vehicle—e.g., in a taxi and/or ride-sharing situation), an alternate screen or display (e.g., a screen on a driver's car door, armrest, corner dashboard, or other area) may be used to display information instead of or in addition to a main screen. For example, in a public privacy mode, information may be obscured or obfuscated on a main screen (e.g., "Account balance: hidden"), but the information may be displayed on an alternate screen or display (e.g., showing an actual account balance). Alternatively or additionally, information may be delivered to a driver or user in a spoken or audio manner instead of or in addition to being displayed, based on a privacy mode. For example, in a public privacy mode, some or all information may be obscured or obfuscated on a main screen, but text-to-speech translation may be performed on the some or all information to provide the information to the driver or user in a private manner (e.g., a main screen obscures and/or obfuscates an account balance, but a spoken account balance may be played in a driver's or user's headset).

In another example, one or more custom modes may be created, based on a user need. For example, business mode, co-worker mode, hidden mode, or other modes, in some embodiments, might not come pre-programmed in the system, but may be created by a user.

In some embodiments, the system may recognize presence of family members through facial recognition, audio recognition, mobile-device detection, or the like.

In some embodiments, the system may support overriding a currently active privacy mode in case of a user need. For example, if a current privacy mode is active—and, for example, information on a screen is obscured as a result—a user may provide input to the system to override the obscuring of the information and cause the information to be displayed.

In some embodiments, modes may have different access. For example, the system may perform recognizing phone numbers, content, or search to determine a mode automatically.

In some embodiments, a system may announce details of a privacy mode to one or more of a user and a recipient. For example, on startup or after activation of a particular mode, the system may display an indication and/or announce names of identified candidates (e.g., driver and passenger(s) in a vehicle), and/or a privacy mode that has been activated based on the identified candidates. In some embodiments, when a call is received, the system may provide a notification to one or more of the caller and the call recipient that a particular mode is active (e.g., "public mode is active"), so that one or both of the caller and the call recipient are careful not to say private or confidential information.

One or more privacy modes may be integrated into a system to use or be activated in one or more ways. For example, a code, keycode, personal identification number (PIN), gesture, image, sound, facial expression, or other activation or deactivation input may be associated with a particular privacy mode, so that, when the input is received, the system may activate or deactivate the particular privacy mode. Similarly, a particular mode may be activated or deactivated based on a fingerprint scan, speech and/or voice recognition, an iris scanner, detected proximity to known or unknown mobile devices, phone numbers, or the like. For example, a system may have co-workers added to the system, so that when one or more co-workers enter a company vehicle, a "co-worker" privacy mode may be automatically activated based on detecting the one or more co-workers in the vehicle.

In another example, if a pre-defined activation phrase is received, the system may activate a particular mode and/or take another action. For example, a distress phrase may be pre-associated with a distress mode, so if the distress phrase is received, a distress mode may be activated, an emergency number (e.g., 911) may be called, a text message may be sent, or the like. The distress mode may, in some embodiments, be similar to a hidden or listen-only mode, so that the system is not obviously in a distress mode. Thus, if an intruder enters a vehicle, the driver or passenger may speak a distress word or phrase, which may activate a distress mode or call for help, without providing an indication of the distress mode or call for help. In some embodiments, the system may provide an indication of the distress mode that is a disguised indication. For example, a light may blink, a feature may be activated or deactivated (e.g., the radio may turn on or off, cruise control may be turned on or off, a light or lights may turn on or off, or the like), a non-distress and non-suspicious phrase may be announced (e.g., "speed camera ahead"), or the like. This may provide confirmation to the driver or passenger of the activation of the distress mode, without causing suspicion to the intruder.

A mode may be activated for obscuring information on a screen of a vehicle, of an ATM, a cell phone, a smartphone, a laptop, a tablet, a desktop computer, or the like. For example, if a user is using an ATM, a privacy mode may be activated or deactivated based on determining who is standing near the ATM (e.g., a primary user, a close bystander, a distant bystander, or the like).

These and other features are described in more detail below.

Figure 1B:
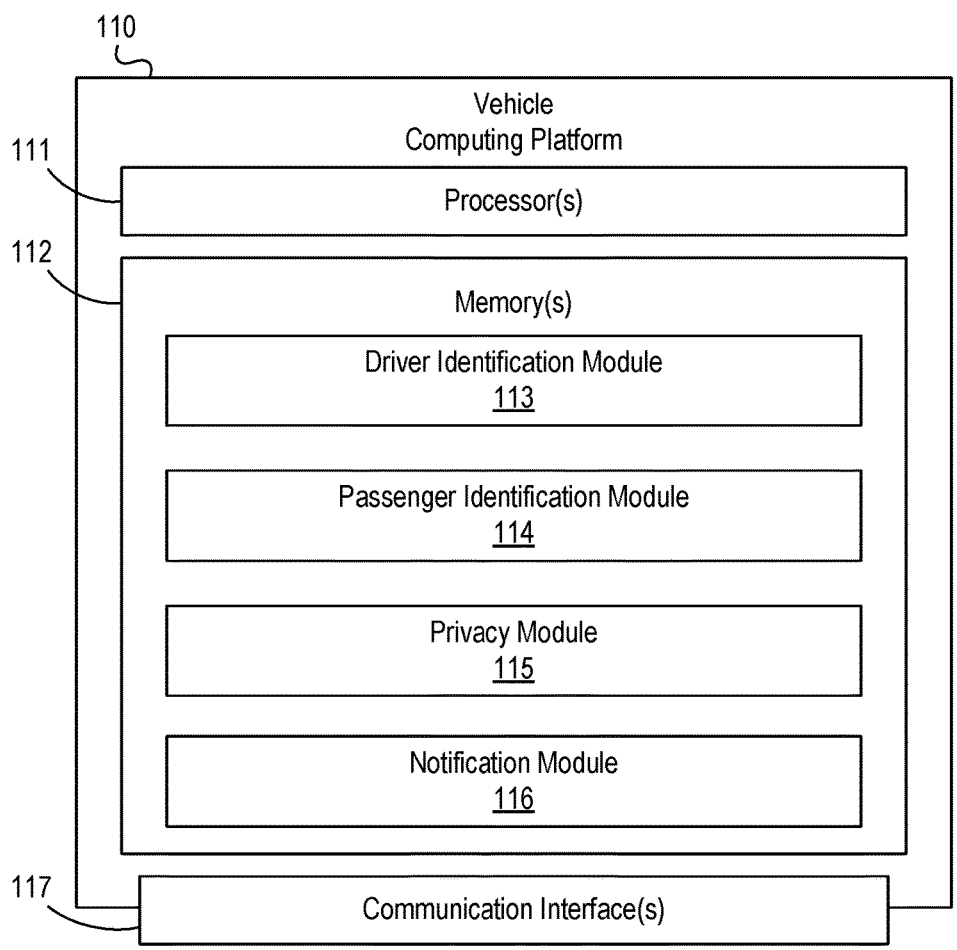

FIGS. 1A and 1B depict an illustrative computing environment for preventing unauthorized access to secured information using identification techniques in accordance with one or more example embodiments. Referring to FIG. 1A, computing environment 100 may include one or more computing devices. For example, computing environment 100 may include a client portal server 120, a client support server 130, an administrative computing device 140, a vehicle computing platform 110, vehicle sensors 115, camera 125, microphone 135, a first client computing device 160, and a second client computing device 170.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as vehicle computing platform 110, client computing device 160, and client computing device 170. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client support server 130 may be configured to initiate and/or provide one or more client support sessions. For example, client support server 130 may include and/or integrate with one or more client support servers and/or devices, such as one or more customer service representative devices used by one or more customer service representatives of an organization (which may, e.g., be a financial institution operating client portal server 120), to connect one or more customers of the organization with one or more customer service representatives of the organization via one or more client support sessions.

Administrative computing device 140 may be configured to provide one or more interfaces that allow for configuration and management of one or more other computing devices and/or computer systems included in computing environment 100.

Vehicle computing platform 110 may be configured to provide information to and receive commands from a driver or passenger of a vehicle. Vehicle computing platform 110 may interface with one or more client computing devices, including, for example, first client computing device 160 and/or second client computing device 170. Vehicle computing platform 110 may communicate with and/or provide access to services of one or more computing devices, including, for example, client portal server 120, client support server 130, and administrative computing device 140. Vehicle computing platform 110 may be configured to communicate with one or more input devices, including vehicle sensors 115, camera 125, and microphone 135. One or more input devices in communication with vehicle computing platform 110, including vehicle sensors 115, camera 125, and microphone 135, may be part of vehicle computing platform 110, part of a vehicle, part of a different computing device or platform, and/or standalone devices or components.

Client computing device 160 may be configured to be used by a first person. In some instances, for example, client computing device 160 may be used by a driver of a vehicle associated with vehicle computing platform 110, a passenger of the vehicle associated with vehicle computing platform 110, or a person outside the vehicle associated with vehicle computing platform 110. Client computing device 160 may communicate with one or more computer systems in computing environment 100, such that the one or more computer systems provide one or more communications to client computing device 160, as illustrated in greater detail below. Client computing device 170 may be configured to be used by a second person (who may, e.g., be different from the first person). In some instances, client computing device 170 may, for example, be used by a driver of a vehicle associated with vehicle computing platform 110, a passenger of the vehicle associated with vehicle computing platform 110, or a person outside the vehicle associated with vehicle computing platform 110. Client computing device 170 may communicate with one or more computer systems in computing environment 100, such that the one or more computer systems provide one or more communications to client computing device 170, as illustrated in greater detail below.

In one or more arrangements, client portal server 120, client support server 130, administrative computing device 140, vehicle computing platform 110, client computing device 160, and client computing device 170 may be any type of computing device capable of receiving a user interface, receiving input via the user interface, and communicating the received input to one or more other computing devices. For example, client portal server 120, client support server 130, administrative computing device 140, vehicle computing platform 110, client computing device 160, and client computing device 170 may, in some instances, be and/or include server computers, desktop computers, laptop computers, tablet computers, in-vehicle computers, smart phones, smart watches, or the like that may include one or more processors, memories, communication interfaces, storage devices, and/or other components. As noted above, and as illustrated in greater detail below, any and/or all of client portal server 120, client support server 130, administrative computing device 140, vehicle computing platform 110, client computing device 160, and client computing device 170 may, in some instances, be special-purpose computing devices configured to perform specific functions.

Computing environment 100 also may include one or more computing platforms. For example, computing environment 100 may include vehicle computing platform 110. As illustrated in greater detail below, vehicle computing platform 110 may include one or more computing devices configured to perform one or more of the functions described herein. For example, vehicle computing platform 110 may include one or more computers (e.g., laptop computers, desktop computers, servers, server blades, in-vehicle computers, or the like).

Computing environment 100 also may include one or more networks, which may interconnect one or more of client portal server 120, client support server 130, administrative computing device 140, vehicle computing platform 110, client computing device 160, and client computing device 170. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client portal server 120, client support server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client portal server 120, client support server 130, and administrative computing device 140 and one or more other computing devices and/or computer systems that are used by, operated by, and/or otherwise associated with the organization. Public network 190 may connect private network 195 and/or one or more computing devices connected thereto (e.g., client portal server 120, client support server 130, and administrative computing device 140) with one or more networks and/or computing devices that are not associated with the organization. For example, vehicle computing platform 110, client computing device 160, and client computing device 170 might not be associated with an organization that operates private network 195 (e.g., because vehicle computing platform 110, client computing device 160, and client computing device 170 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect vehicle computing platform 110, client computing device 160, and client computing device 170 to private network 195 and/or one or more computing devices connected thereto (e.g., client portal server 120, client support server 130, and administrative computing device 140).

Referring to FIG. 1B, vehicle computing platform 110 may include one or more processors 111, memory 112, and communication interface 117. A data bus may interconnect processor(s) 111, memory 112, and communication interface 117. Communication interface 117 may be a network interface configured to support communication between vehicle computing platform 110 and one or more networks (e.g., private network 195, public network 190, or the like). Memory 112 may include one or more program modules having instructions that when executed by processor(s) 111 cause vehicle computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up vehicle computing platform 110. For example, memory 112 may have, store, and/or include a driver identification module 113, passenger identification module 114, privacy module 115, and a notification module 116. Driver identification module 113 may have instructions that direct and/or cause vehicle computing platform 110 to identify a driver of a vehicle. Passenger identification module 114 may have instructions that direct and/or cause vehicle computing platform 110 to identify one or more passengers of a vehicle.

Privacy module 115 may have instructions that direct and/or cause vehicle computing platform 110 to protect privacy of information associated with the driver of the vehicle and/or the passenger(s) of the vehicle, for example, by partially or wholly obscuring or revealing a screen or other interface configured to provide the information associated with the driver of the vehicle and/or the passenger(s) of the vehicle. Notification module 116 may have instructions that direct and/or cause vehicle computing platform 110 to cause notification to a driver of a vehicle, a passenger of a vehicle, and/or a person not in the vehicle of a status of a privacy mode of the vehicle.

Figure 2A:
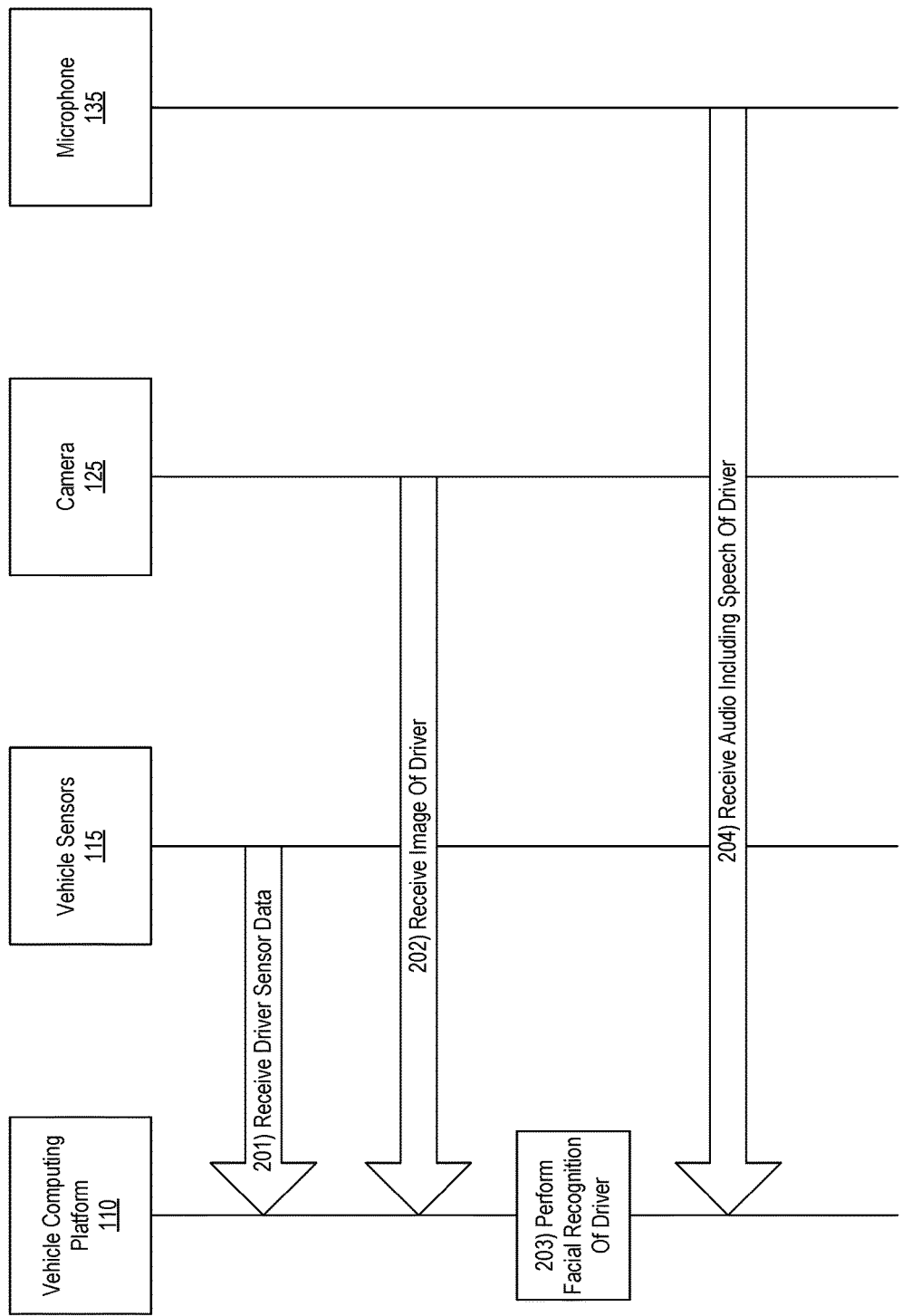
Figure 2C:
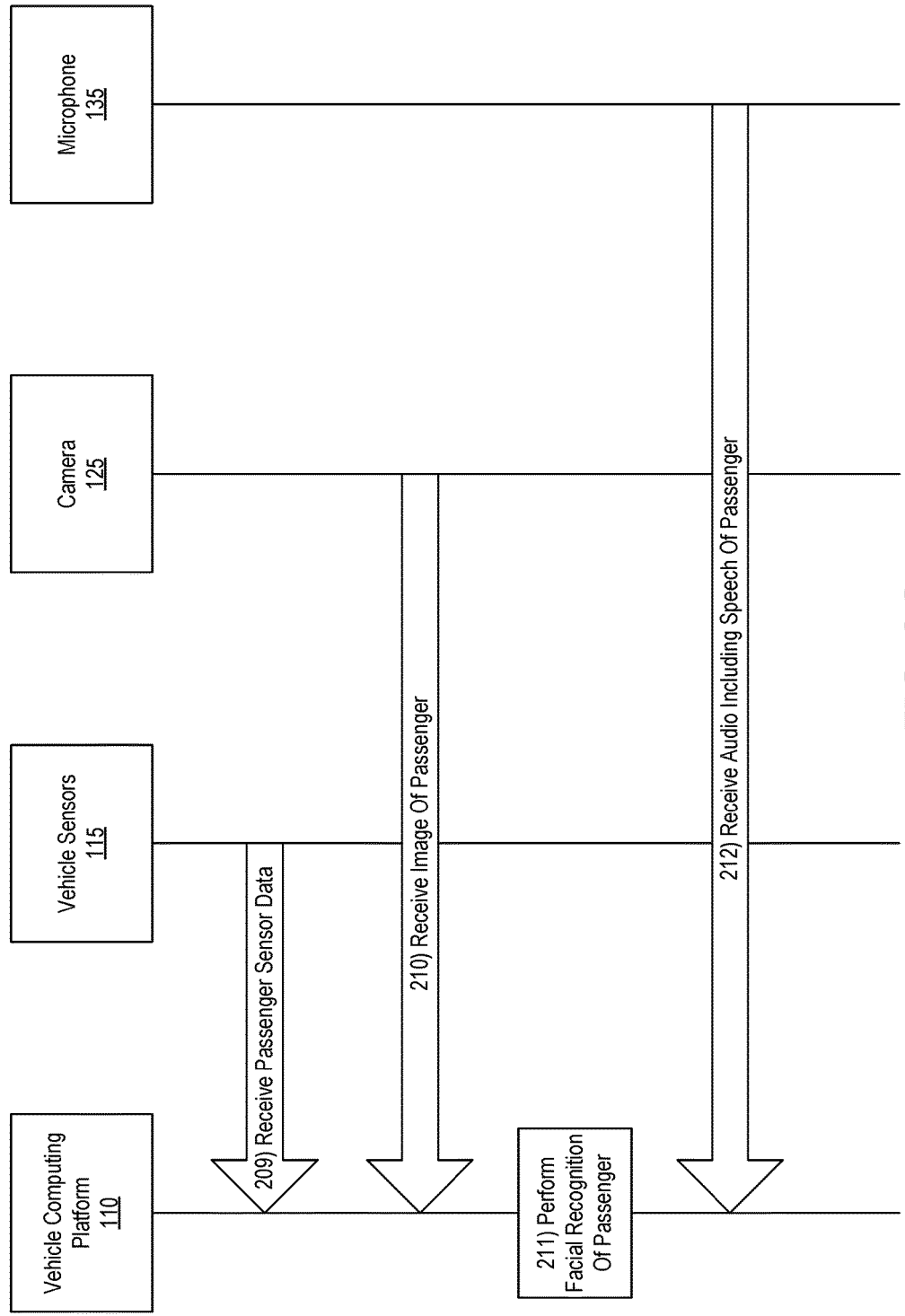

FIGS. 2A-2F depict an illustrative event sequence for preventing unauthorized access to secured information using identification techniques in accordance with one or more example embodiments. Referring to FIG. 2A, at step 201, vehicle computing platform 110 may receive driver sensor data. For example, vehicle computing platform 110 may receive driver sensor data from vehicle sensors 115. Driver sensor data may indicate whether a driver seat in a vehicle is occupied. Vehicle sensors 115 may include seat-weight sensors, body scanners, lasers, cameras, scales, infrared sensors, microwave sensors, fingerprint scanners, retina scanners, biometric scanners, or other sensors for gathering data about a driver of a vehicle. The information gathered from one or more of vehicle sensors 115 may be associated with the driver of the vehicle, and therefore may be provided to vehicle computing platform 110.

At step 202, vehicle computing platform 110 may receive one or more images, which may include images of the driver. For example, vehicle computing platform 110 may receive the one or more images from camera 125. In some embodiments, vehicle computing platform 110 may, alternatively or additionally, receive images from vehicle sensors 115 (receiving from vehicle sensors 115 not illustrated). In some embodiments, the driver identification information may include at least one image of the driver of the vehicle. At step 203, vehicle computing platform 110 may perform facial recognition of the driver. For example, vehicle computing platform 110 may analyze one or more of the images and/or sensor data of the driver of the vehicle to identify a face or faces of the driver of the vehicle, and/or to determine the identity of the driver.

At step 204, vehicle computing platform 110 may receive audio, which may include speech spoken by the driver. For example, vehicle computing platform 110 may receive the audio from microphone 135. Referring to FIG. 2B, at step 205, vehicle computing platform 110 may perform voice recognition of the speech spoken by the driver. Performing voice recognition of the speech spoken by the driver of the vehicle may include performing voice recognition of the audio to determine the identity of the driver.

At step 206, vehicle computing platform 110 may receive driver identification information. For example, a driver may login or otherwise identify to vehicle computing platform 110 via an interface of vehicle computing platform 110. In some embodiments, vehicle computing platform 110 may determine a presence of a mobile device associated with the driver.

At step 207, vehicle computing platform 110 may determine an identity of the driver. Vehicle computing platform 110 may determine an identity of a driver of the vehicle based on one or more of the driver sensor data, images of the driver, facial recognition of the driver, audio, voice recognition of the driver, the driver identification information, or the like.

At step 208, vehicle computing platform 110 may activate a driver profile associated with the driver. The driver profile may be activated based on the identity of the driver of the vehicle. In some embodiments, if vehicle computing platform 110 determines the presence of a mobile device associated with the driver, the driver profile—which may be associated with the mobile device associated with the driver (e.g., the driver may have associated the mobile device with the profile when the profile is created)—may be activated Referring to FIG. 2C, at step 209, vehicle computing platform 110 may receive passenger sensor data. For example, vehicle computing platform 110 may receive passenger sensor data from vehicle sensors 115. Passenger sensor data may indicate whether a passenger seat in the vehicle is occupied. Vehicle sensors 115 may include seat-weight sensors, body scanners, lasers, cameras, scales, infrared sensors, microwave sensors, fingerprint scanners, retina scanners, biometric scanners, or other sensors for gathering data about one or more passengers of a vehicle. The information gathered from one or more of vehicle sensors 115 may be associated with the one or more passengers of the vehicle, and therefore may be provided to vehicle computing platform 110.

At step 210, vehicle computing platform 110 may receive one or more images, which may include images of one or more passengers of the vehicle. For example, vehicle computing platform 110 may receive the one or more images from camera 125. In some embodiments, vehicle computing platform 110 may, alternatively or additionally, receive images from vehicle sensors 115 (receiving from vehicle sensors 115 not illustrated). In some embodiments, the passenger identification information may include at least one image of the passenger of the vehicle. At step 211, vehicle computing platform 110 may perform facial recognition of the one or more passengers of the vehicle. For example, vehicle computing platform 110 may analyze one or more of the images and/or sensor data of the one or more passengers of the vehicle to identify a face or faces of the one or more passengers of the vehicle, and/or to determine the identity of the one or more passengers.

Figure 2D:
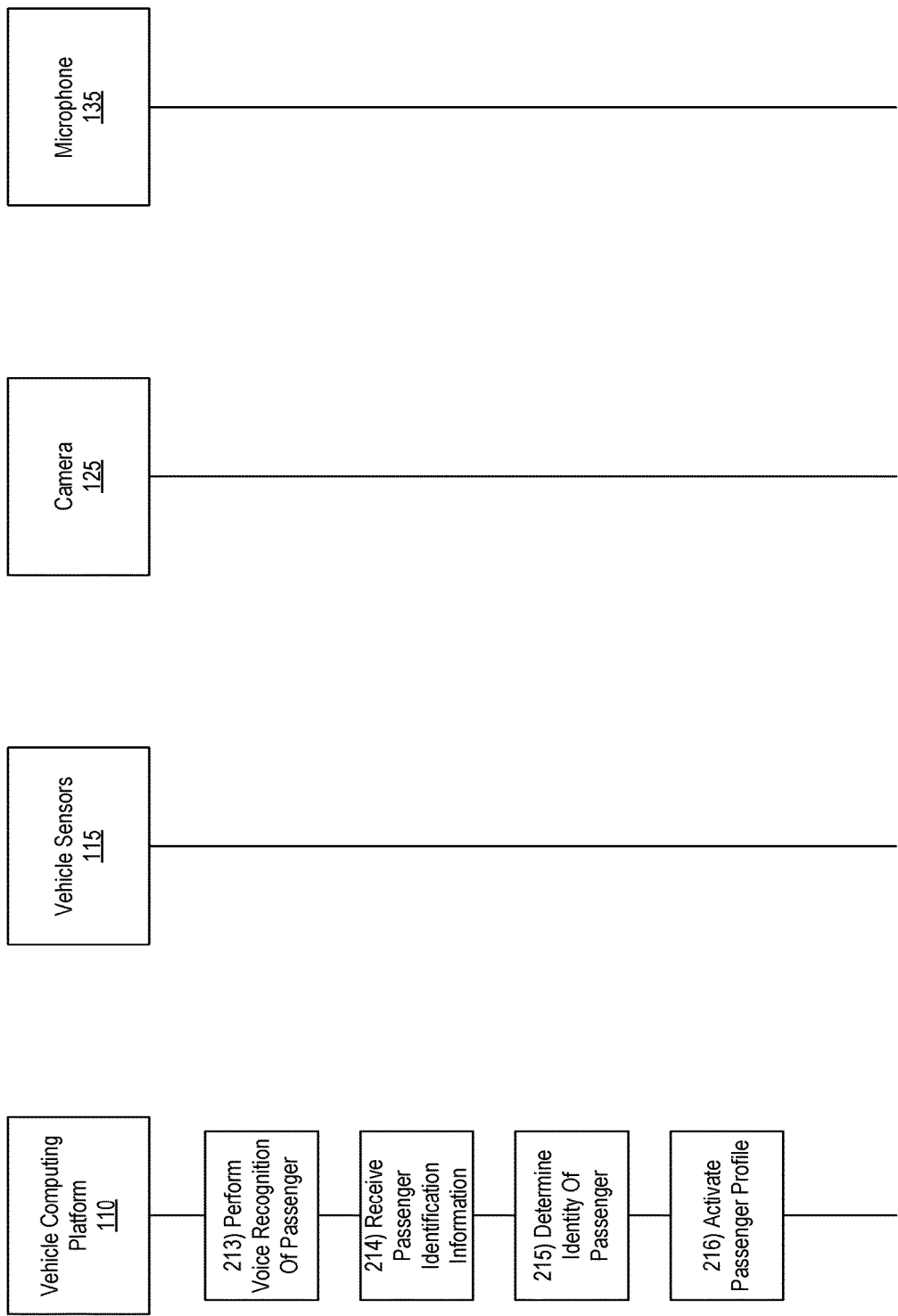

At step 212, vehicle computing platform 110 may receive audio, which may include speech spoken by one or more passengers of the vehicle. For example, vehicle computing platform 110 may receive the audio from microphone 135. Referring to FIG. 2D, at step 213, vehicle computing platform 110 may perform voice recognition of the speech spoken by the one or more passengers of the vehicle. Performing voice recognition of the speech spoken by the one or more passengers of the vehicle may include performing voice recognition of the audio to determine the identity of the passenger.

At step 214, vehicle computing platform 110 may receive passenger identification information. For example, a passenger may login or otherwise identify to vehicle computing platform 110 via an interface of vehicle computing platform 110. In some embodiments, vehicle computing platform 110 may determine a presence of a mobile device associated with the passenger.

At step 215, vehicle computing platform 110 may determine an identity or identities of one or more passengers of the vehicle. Vehicle computing platform 110 may determine an identity of a passenger of the vehicle based on one or more of the passenger sensor data, images of one or more passengers, facial recognition of the passengers, audio, voice recognition of the passengers, the passenger identification information, or the like.

At step 216, vehicle computing platform 110 may activate a passenger profile or passenger profiles associated with one or more passengers of the vehicle. The passenger profile or passenger profiles may be activated based on the identity or identities of the one or more passengers of the vehicle. In some embodiments, if vehicle computing platform 110 determines the presence of a mobile device associated with the passenger, the passenger profile—which may be associated with the mobile device associated with the passenger (e.g., the passenger may have associated the mobile device with the profile when the profile is created)—may be activated.

Referring to FIG. 2E, at step 217, vehicle computing platform 110 may receive an activation phrase. The activation phrase may be received from a microphone (e.g., microphone 135). The activation phrase may correspond to a privacy mode of a plurality of privacy modes.

At step 218, vehicle computing platform 110 may determine a location of the vehicle. For example, a vehicle may be located near a driver's and/or passenger's home, near a driver's and/or passenger's work, near a stadium, near a school, or the like. A vehicle may be located on a particular street, within a particular town or city, within a particular county or borough, within a particular state or province, within a particular country, or the like. The vehicle may be within one or more pre-defined geo-fences.

At step 219, vehicle computing platform 110 may determine a type of key being used for the vehicle. For example, a type of key for the vehicle may be a standard key, a limited-use key (e.g., a valet key), or the like. A privacy mode may be selected based on a type of key being used for the vehicle.

At step 220, vehicle computing platform 110 may determine a privacy mode of the vehicle. A privacy mode may cause particular information to be obscured or not obscured. Vehicle computing platform may have one or more privacy modes (e.g., private, public, semi-private, family, co-worker, stranger, ride-sharing, or the like).

A privacy mode may cause activation or deactivation of a particular privacy setting. For example, in a case that a first privacy mode of the plurality of privacy modes is activated, vehicle computing platform 110 may apply a first privacy setting to a first application of the vehicle, and apply a second privacy setting to a second application of the vehicle. Further, in a case that a second privacy mode of the plurality of privacy modes is activated, vehicle computing platform 110 may apply a third privacy setting to the first application, the third privacy setting being different from the first privacy setting, and apply a fourth privacy setting to the second application, the fourth privacy setting being different from the second privacy setting.

A privacy mode of the vehicle may be determined based on one or more factors discussed above, including driver information, passenger information, an activation phrase, a location of the vehicle, a type of key in the vehicle, a state of the vehicle, a type of the vehicle (e.g., a personal car, a taxi, a rental car, a company car, a ride-sharing car, or the like), a person in the vehicle or not in the vehicle, or the like.

A driver or passenger may select a privacy profile for the vehicle. The privacy profile may include one or more settings relating to information to be obscured on a screen of the vehicle, from being played over speakers of the vehicle, or the like.

A privacy mode may be determined based on an activation phrase received. For example, if an activation phrase is a distress phrase, the privacy mode may be a distress mode. An activation phrase may be a phrase that is pre-programmed into the system to allow, when the the activation phrase is spoken, for a particular action to be taken (e.g., a particular privacy mode may be activated, information transmitted, or the like).

In some embodiments, a privacy mode may cause a viewing angle to be selected or adjusted for a screen of the vehicle. For example, in a private viewing mode (e.g., which may be active when the driver is alone in the vehicle), a wide viewing angle may be active for one or more screens of the vehicle, which may allow for the one or more screens to be viewed from any angle in the vehicle. In a different privacy mode, however, a different viewing angle may be activated. For example, in a privacy mode based on other passengers or drivers being in the vehicle (e.g., a public mode, a taxi mode, a co-worker mode, or the like), a reduced viewing angle may be activated, which may make one or more screens of the vehicle difficult to read or otherwise obscured for one or more people in the vehicle (e.g., the passengers in the vehicle might not be able to read the screen as easily as the driver of the vehicle when the reduced viewing angle is active).

In some embodiments, based on a privacy mode, data presented on the screen may be obfuscated or altered (e.g., to display pre-determined values set by a driver, vehicle owner, account owner, or the like). For example, data displayed on a screen may be displayed in a non-obfuscated or non-altered state when a private privacy mode is active (e.g., the driver or user is alone). But when a different privacy mode (e.g., a public privacy mode, a taxi privacy mode, a ride-sharing privacy mode, or the like) is active, pre-determined values for one or more fields may be displayed in place of actual information. For example, if a public privacy mode is active, if a text message is received and displayed on a screen, a false or shortened phone number (e.g., instead of a full phone number, just display the first digit, the last digit, a middle digit, asterisks, or the like), a shortened name or nickname (e.g., instead of a spouse's name, display "Spouse" or "Person 1," or a nickname), or other pre-determined replacement information may be displayed in one or more fields of the text message in place of the actual information relating to that text message. In this manner, privacy of the text-message sender may be preserved, and the driver is still able to access the text message, even though a passenger is in the vehicle. Similarly, if financial information is being accessed, financial information may be obscured or obfuscated by displaying different information than the actual information (e.g., obfuscating an account balance, account number, bank name, or the like by displaying pre-set values set by a driver or account owner). For example, if an ATM user is using an ATM, and the ATM is in a non-private privacy mode (e.g., another person is standing too close to the account owner using the ATM), account balance, account number, account address, or other account information may be replaced with "hidden" or another string or number.

In some embodiments, a privacy mode may result in text-to-speech and/or speech-to-text translation of keywords, private data elements, or the like. For example, in some embodiments, when the system is in a particular privacy mode, some or all information may be displayed on an alternate screen or display than a screen or display that might be used in a different privacy mode. For example, in a private mode (e.g., a mode that may be active when a user is alone using the system—e.g., a driver is in a vehicle with no passengers), a main screen or display may be used. But in a different privacy mode (e.g., a public mode, a taxi mode, a ride-sharing mode, or the like), an alternate screen or display (e.g., a screen on a driver's car door, armrest, corner dashboard, or other area) may be used to display information instead of or in addition to a main screen. For example, in a public mode, information may be obscured or obfuscated on a main screen (e.g., "Account balance: hidden"), but the information may be displayed on an alternate screen or display (e.g., a screen on a driver's car-door armrest may show an actual account balance). In another example, information may be displayed on a headgear-type device to support 360 degree view with information superimposed on a screen, glass, or display. For example, the system may connect with glasses or a headset that have a heads-up display, and may display selected information (e.g., sensitive or private information) on a display of the glasses or headset, based on a privacy mode.

Alternatively or additionally, based on a privacy mode, information may be delivered to a driver or user in a spoken or audio manner instead of or in addition to being displayed. For example, in a public mode, some or all information may be obscured or obfuscated on a main screen (e.g., a main screen obscures and/or obfuscates an account balance), but text-to-speech translation may be performed on the some or all information to provide the information to the driver or user in a private manner (e.g., audio of a spoken account balance may be played in a driver's or user's headset).

Referring to FIG. 2F, at step 221, vehicle computing platform 110 may activate the privacy mode of the vehicle.

At step 222, vehicle computing platform 110 may obscure information on a screen of the vehicle. For example, based on the passenger sensor data indicating that the passenger seat in the vehicle is occupied, vehicle computing platform 110 may obscure information on a screen of the vehicle. In some embodiments, vehicle computing platform 110 may determine the information to be obscured based on the identity of the passenger. In some embodiments, the information on the screen of the vehicle may be information associated with a driver of the vehicle. In some embodiments, the information on the screen of the vehicle may include one or more of a text message to the driver of the vehicle, a voicemail to the driver of the vehicle, and/or a call history of the driver of the vehicle. In some embodiments, based on the driver sensor data indicating that the driver seat in the vehicle is not occupied, and the passenger sensor data indicating that the passenger seat in the vehicle is occupied, vehicle computing platform 110 may deactivate the screen of the vehicle.

In some embodiments, information on a screen of the vehicle may be obscured or displayed based on a type of key being used in the vehicle. Alternatively or additionally, a privacy mode may be selected based on a type of key being used for the vehicle. For example, if a valet key is used, a public privacy mode may be activated, which may cause less information to be displayed on a screen of the vehicle than if a standard key is being used. In some embodiments, a valet mode may be activated in response to a valet key being used, which may prevent any information from being displayed on a screen of the vehicle while a valet key is being used.

Alternatively or additionally one or more vehicle features may be activated or deactivated based on a type of key being used in the vehicle. For example, a trunk may be locked or unlocked, a glove compartment may be locked or unlocked, a remote start feature may be usable or unusable, a car alarm may be set in a particular mode, or the like.

In some embodiments, information on a screen of the vehicle may be obscured or displayed based on a privacy profile of the vehicle.

Figure 3A:
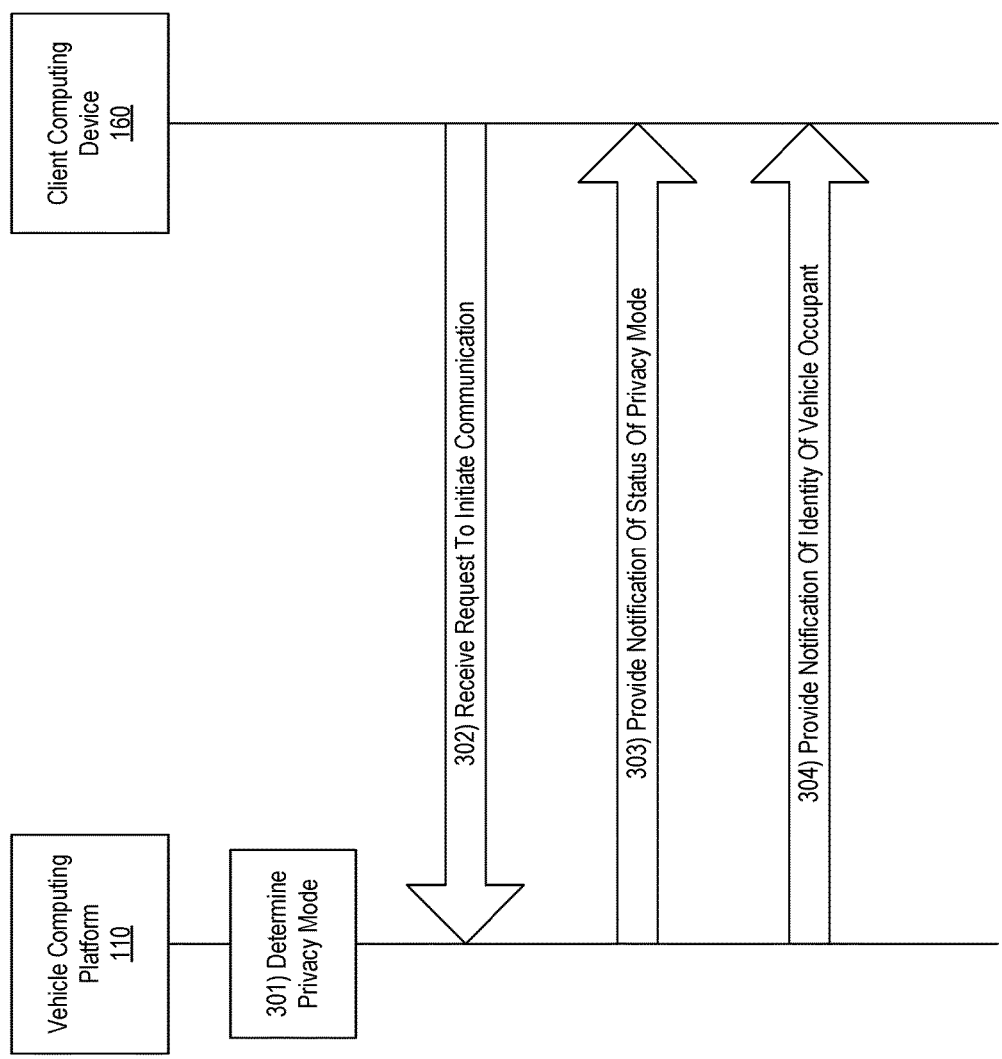
FIGS. 3A and 3B depict an illustrative event sequence for preventing unauthorized access to secured information using identification techniques in accordance with one or more example embodiments.
Figure 3B:
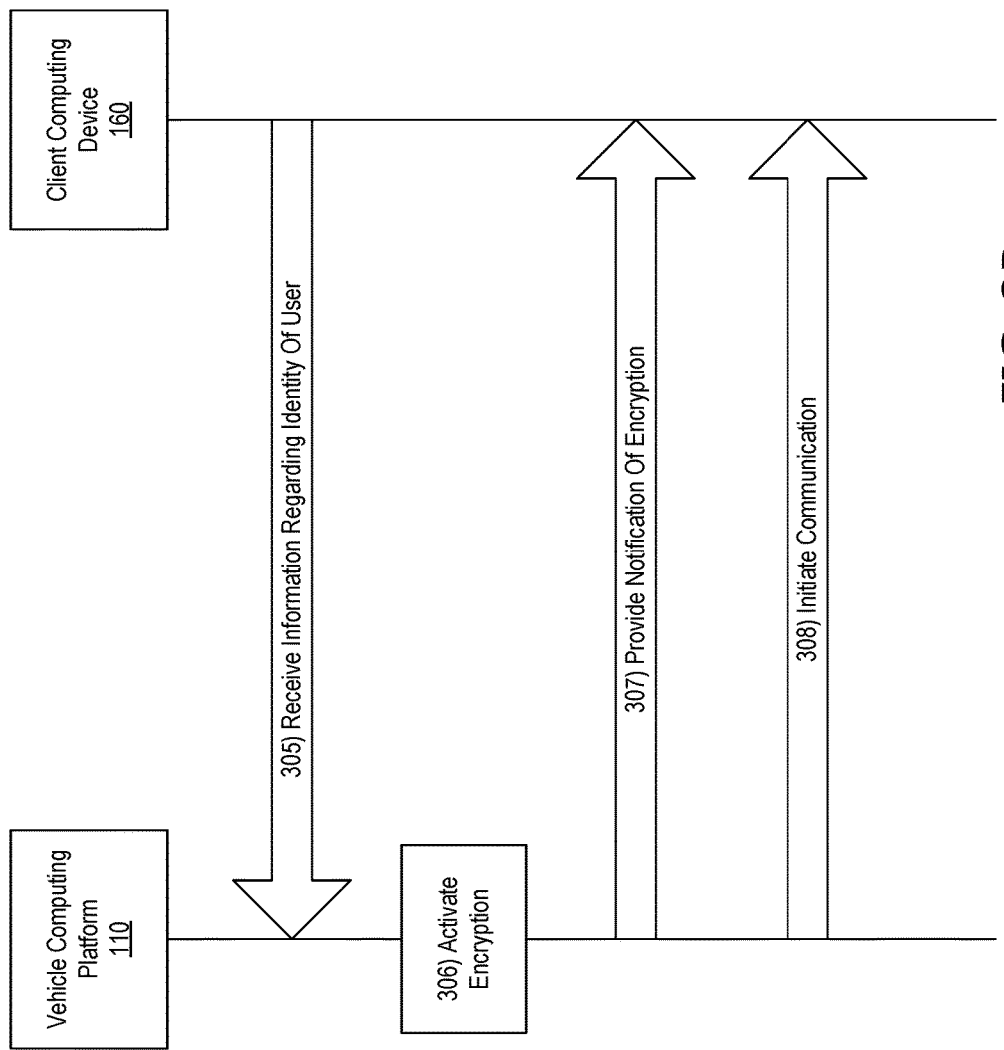

FIGS. 3A-3B depict an illustrative event sequence for preventing unauthorized access to secured information using identification techniques in accordance with one or more example embodiments.

Referring to FIG. 3A, at step 301, vehicle computing platform 110 may determine a privacy mode of a vehicle. The privacy mode may be based on a first identity of the first vehicle occupant and a second identity of a second vehicle occupant.

At step 302, vehicle computing platform 110 may receive a request to initiate communication between the vehicle computing platform 110 and a device inside or outside the vehicle (e.g., client computing device 160). For example, vehicle computing platform 110 may receive a telephone call from client computing device 160. In some embodiments, vehicle computing platform 110 may receive a notification that a mobile device connected to vehicle computing platform 110 may receive a telephone call from client computing device 160.

At step 303, vehicle computing platform 110 may provide notification of a status of a privacy mode (e.g., of the vehicle). Vehicle computing platform 110 may cause an audio, video, text, and/or other message to be provided to client computing device 160 regarding a privacy mode. For example, if a user of client computing device 160 is trying to initiate a telephone call to a driver of the vehicle that includes vehicle computing platform 110, vehicle computing platform 110 may provide, to the user of client computing device 160, a notification of the currently active privacy mode of the vehicle. The notification of the currently active privacy mode of the vehicle may be an audio notification to a caller using the device outside the vehicle, the audio notification including the status of the privacy mode of the vehicle.

In some embodiments, the privacy mode of the vehicle may be a first privacy mode during a first time of day, and the privacy mode of the vehicle may be a second privacy mode during a second time of the day.

The notification of the privacy mode of the vehicle may be provided to a user of the client computing device 160, to a driver or passenger of the vehicle, or both. For example, if a user of client computing device 160 is trying to call a driver of the vehicle, before voice communication is activated, client computing device 160 may receive, from vehicle computing platform 110, an audio or text notification of a privacy mode that the vehicle is in. For example, if a person at home is trying to call a spouse in the vehicle, and the vehicle has the spouse and the spouse's co-worker, before the call is activated (e.g., before the call rings, while the call is ringing, immediately after the driver answers the call, or the like), the spouse may be notified that the vehicle is in the co-worker mode. In this manner, the person at home may know that the spouse in the vehicle has a co-worker in the vehicle with the spouse, and therefore may know to conduct the telephone call with the spouse accordingly.

At step 304, vehicle computing platform 110 may provide notification of one or more identities of one or more vehicle occupants. For example, before initiating communication (e.g., a telephone call) with client computing device 160, vehicle computing platform 110 may provide a notification to the device outside the vehicle of a status of the privacy mode of the vehicle.

Referring to FIG. 3B, at step 305, vehicle computing platform 110 may receive information regarding an identity of a user of client computing device 160. For example, if the user of the client computing device 160 is outside the vehicle, vehicle computing platform 110 may receive information regarding an identity of the user of the client computing device 160 outside the vehicle.

At step 306, vehicle computing platform 110 may cause activation of an encryption of communication between vehicle computing platform 110 and client computing device 160. For example, vehicle computing platform 110 may, based on the first identity of the first vehicle occupant, the second identity of the second vehicle occupant, and/or the third identity of the user of the device outside the vehicle, encrypt the telephone call.

At step 307, vehicle computing platform 110 may provide notification of encryption. For example, vehicle computing platform 110 may provide notification to client computing device 160 that a telephone call between client computing device 160 and vehicle computing platform 110 (or a device connected to vehicle computing platform 110) is encrypted.

At step 308, vehicle computing platform 110 may initiate communication between vehicle computing platform 110 and client computing device 160. For example, if the communication between vehicle computing platform 110 and client computing device 160 is a telephone call between client computing device 160 and vehicle computing platform 110 (or a device connected to vehicle computing platform 110), after providing notifications regarding a privacy mode of the vehicle, whether the call is encrypted, an identity or identities of the driver and/or passenger(s) of the vehicle, and/or other information, the caller may be connected to the vehicle computing platform 110 (or a device connected to vehicle computing platform 110) to conduct the telephone call with the call recipient.

Figure 4A:
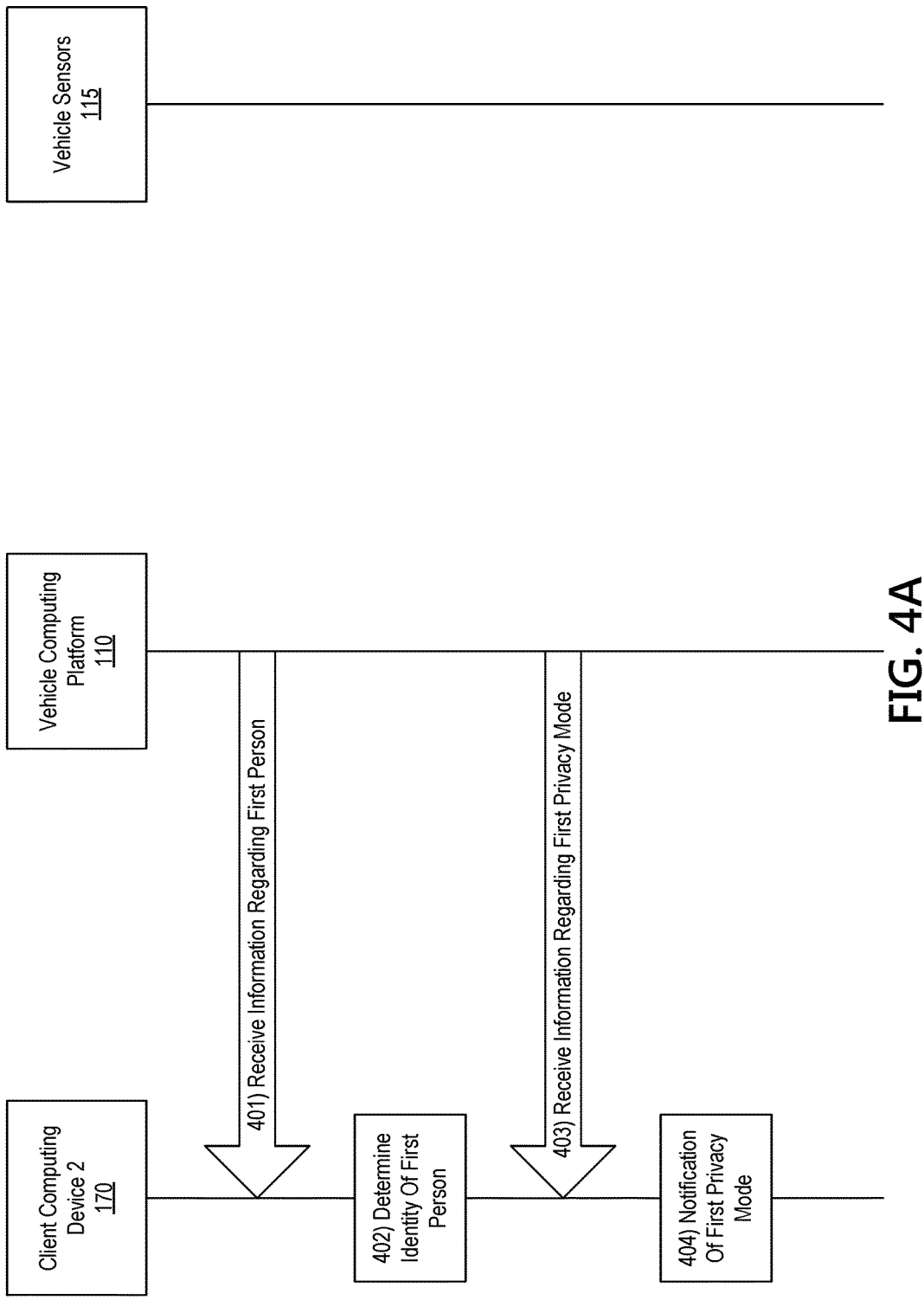

FIGS. 4A-4D depict an illustrative event sequence for preventing unauthorized access to secured information using identification techniques in accordance with one or more example embodiments. Referring to FIG. 4A, at step 401, client computing device 170 (e.g., a smartphone, watch, other wearable device, or the like, which may be configured to communicate wirelessly with vehicle computing platform 110) may receive information regarding a first person from vehicle computing platform 110. For example, similar to the above discussion with regard to receiving information about and determining an identity of a driver or passenger, client computing device 170 may receive information that may be used for determining an identity of a driver or passenger, and/or client computing device 170 may receive information regarding a determined identity of a driver or passenger.

At step 402, client computing device 170 may determine an identity of the first person. For example, client computing device 170 may determine, based on the received information regarding the first person, the identity of the first person (e.g., a driver or passenger).

At step 403, client computing device 170 may receive information regarding a first privacy mode. For example, client computing device 170 may determine a first privacy mode of a vehicle, the first privacy mode based on a first identity of the first vehicle occupant.

At step 404, client computing device 170 may provide notification of the first privacy mode. For example, client computing device 170 may provide a first vibration alert that corresponds to the first privacy mode of the vehicle. Alternatively or additionally, client computing device 170 may cause, via a display or other visual indicator of client computing device 170 and/or vehicle computing platform 110, a visual indication of a current privacy mode (e.g., the first privacy mode) of the vehicle. For example, the visual indication may include a blinking indication corresponding to the current privacy mode (e.g., the first privacy mode) of the vehicle.

Figure 4B:
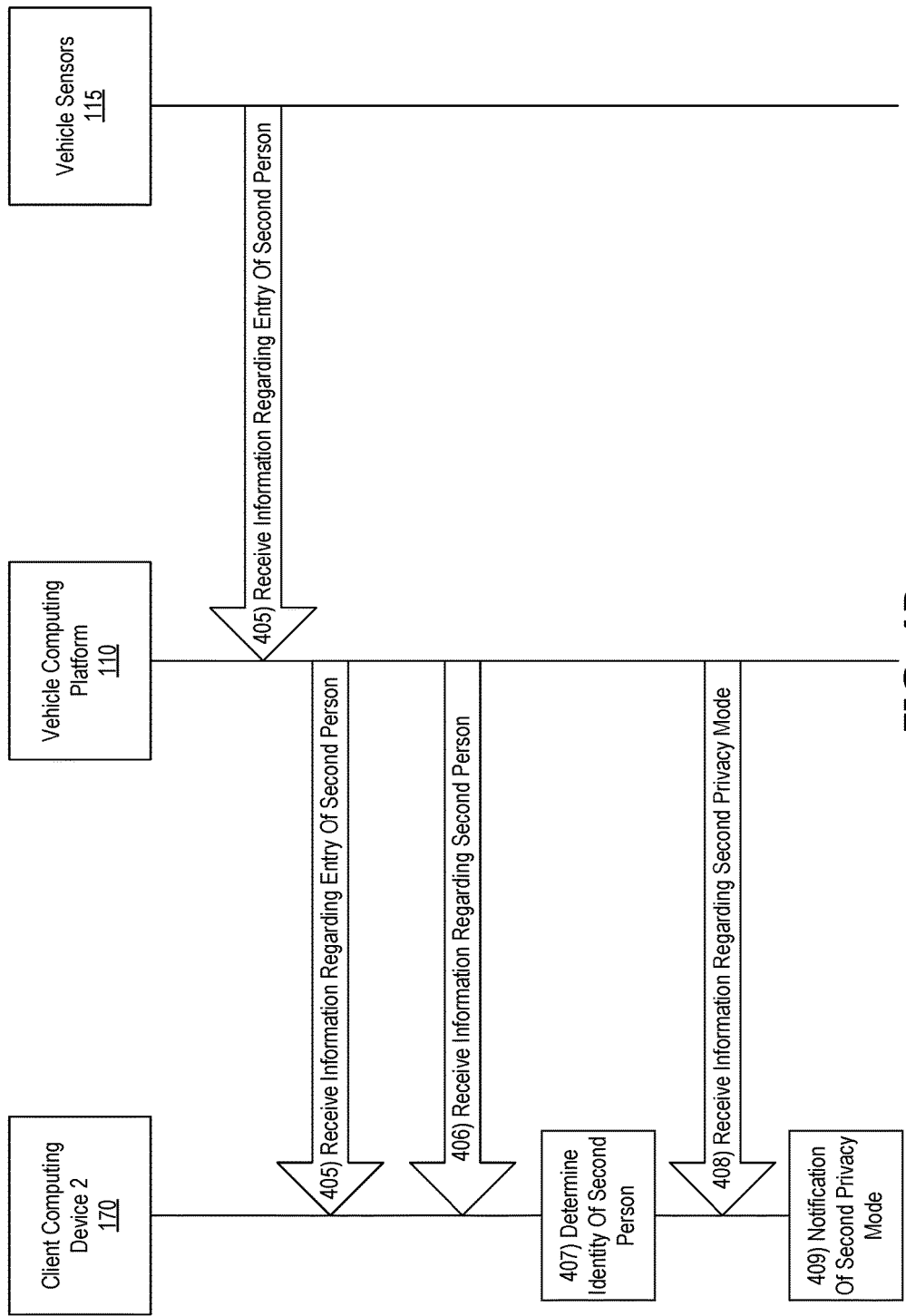

Referring to FIG. 4B, at step 405, vehicle computing platform 110 and/or client computing device 170 may receive information (e.g., a notification) regarding entry of a second person (e.g., a second vehicle occupant) to the vehicle. For example, if a second person entered the vehicle (e.g., a new passenger enters the vehicle with the driver), vehicle computing platform 110 and/or client computing device 170 may receive information from vehicle sensors 115 about the second person.

At step 406, client computing device 170 may receive information regarding the second person. For example, client computing device 170 may receive information regarding an identity of the second vehicle occupant. For example, similar to the above discussion with regard to receiving information about and determining an identity of a driver or passenger, client computing device 170 may receive information that may be used for determining an identity of a driver or passenger, and/or client computing device 170 may receive information regarding a determined identity of a driver or passenger.

At step 407, client computing device 170 may determine an identity of the second person. For example, client computing device 170 may determine the identity of the second person based on the received information regarding the identity of the second vehicle occupant.

At step 408, client computing device 170 may receive information regarding the second privacy mode. For example, client computing device 170 may receive, from vehicle computing platform 110, an indication of what the current privacy mode of the vehicle is.

At step 409, client computing device 170 may provide notification of the second privacy mode. For example, client computing device 170 may provide a second vibration alert that corresponds to the second privacy mode of the vehicle, the second vibration alert different from the first vibration alert. Alternatively or additionally, client computing device 170 may cause, via a display or other visual indicator of client computing device 170 and/or vehicle computing platform 110, a visual indication of a current privacy mode (e.g., the second privacy mode) of the vehicle. For example, the visual indication may include a blinking indication corresponding to the current privacy mode (e.g., the second privacy mode) of the vehicle.

Regarding FIG. 4C, at step 410, vehicle computing platform 110 may provide an indication of the privacy mode. Client computing device 170 may determine a second privacy mode of the vehicle, the second privacy mode based on the first identity of the first vehicle occupant and the second identity of the second vehicle occupant, the second privacy mode different from the first privacy mode.

At step 411, client computing device 170 may provide a notification (e.g., an alert) corresponding to the active privacy mode. For example, client computing device 170 may provide a vibration alert that corresponds to the currently active privacy mode of the vehicle. The vibration alert may uniquely correspond to the currently active privacy mode of the vehicle. Alternatively or additionally, client computing device 170 may cause, via a display or other visual indicator of client computing device 170 and/or vehicle computing platform 110, a visual indication of a current privacy mode of the vehicle. For example, the visual indication may include a blinking indication corresponding to the current privacy mode of the vehicle.

At step 412, client computing device 170 may receive a request to change the privacy mode. For example, client computing device 170 may receive input corresponding to a request to change the current privacy mode of the vehicle to a different privacy mode of the vehicle. Receiving the input corresponding to the request to change the current privacy mode of the vehicle to the different privacy mode of the vehicle may include receiving, via a touch-screen interface, a tap input corresponding to the request to change the current privacy mode of the vehicle to the different privacy mode of the vehicle. A particular tap sequence may be associated with a particular privacy mode (e.g., one tap on the screen to change to a first privacy mode, two taps on the screen to change to a second privacy mode, and the like).

At step 413, client computing device 170 may send a request to change privacy mode.

For example, client computing device 170 may send, to the vehicle (e.g., to vehicle computing platform 110), the request to change the current privacy mode of the vehicle to the different privacy mode (e.g., the privacy mode requested at step 412).

Referring to FIG. 4D, at step 414, client computing device 170 may determine a relationship between a first person in the vehicle and a second person in the vehicle. For example, if the first person and the second person are co-workers, client computing device 170 may determine that the first person and the second person are co-workers. Client computing device 170 based on the determined identity of the first person and the determined identity of the second person. Based on the determined identity, client computing device 170 may determine and/or receive information regarding a profile of the person with the determined identity. The profile may store relationship information between different persons. For example, if a user is a parent with a spouse, information regarding the user's children and spouse may be stored in the user's profile. Alternatively or additionally, other relationships may be stored in the user's profile (e.g., co-workers, friends, extended family, and the like). Therefore, by determining the identities of the people in the vehicle, client computing device 170 may access pre-stored information regarding relationships between the people in the vehicle.

At step 415, client computing device 170 may send a request to activate a mode based on the relationship. Client computing device 170 may send a request to the vehicle (e.g., to vehicle computing platform 110) to activate (e.g., change or maintain) a particular privacy mode. For example, if the people in the vehicle are in a family relationship (e.g., a driver and passenger are spouses), client computing device 170 may send a request to activate a family privacy mode. In another example, if the people in the vehicle are co-workers, client computing device 170 may send a request to activate a co-worker privacy mode. In a further example, if the people in the vehicle are strangers or do not have a defined or determinable relationship (e.g., a taxi driver and passenger), client computing device 170 may send a request to activate a public mode.

At step 416, client computing device 170 may provide an alert regarding a current privacy mode of the vehicle. For example, if the privacy mode was changed (e.g., in response to the request to change the privacy mode), client computing device 170 may provide an alert regarding the changed privacy mode. For example, client computing device 170 may provide a vibration alert that corresponds to the currently active privacy mode of the vehicle. The vibration alert may uniquely correspond to the currently active privacy mode of the vehicle. Alternatively or additionally, client computing device 170 may cause, via a display or other visual indicator of client computing device 170 and/or vehicle computing platform 110, a visual indication of a current privacy mode of the vehicle. For example, the visual indication may include a blinking indication corresponding to the current privacy mode of the vehicle.

Figure 5:
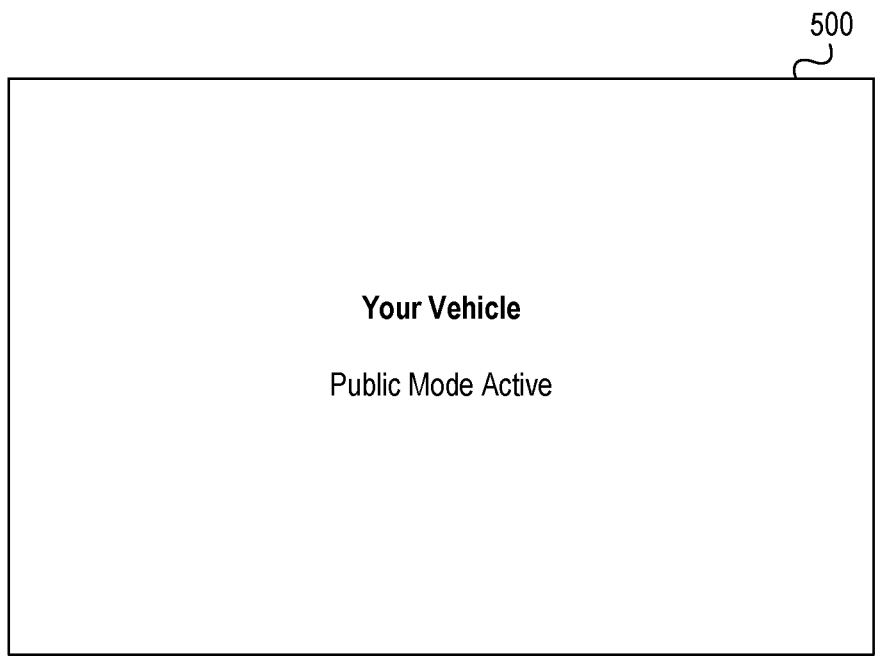
FIGS. 5-8 depict example graphical user interfaces for preventing unauthorized access to secured information using identification techniques in accordance with one or more example embodiments.

FIG. 5 depicts an illustrative example graphical user interface for preventing unauthorized access to secured information using identification techniques in accordance with one or more example embodiments. For example, vehicle computing platform 110 may display and/or otherwise present a graphical user interface similar to graphical user interface 500, which is illustrated in FIG. 5. As seen in FIG. 5, graphical user interface 500 may be a screen that is shown that indicates an active privacy mode of a vehicle. Information that might otherwise be displayed on graphical user interface 500 may be obscured and/or not shown, based on the active privacy mode of the vehicle. For example, graphical user interface 500 may include information identifying a particular privacy mode (e.g., public mode, semi-public mode, private mode, personal mode, family mode, work mode, driving mode, stopped mode, parked mode, and the like). As depicted in graphical user interface 500, the vehicle may display a message that indicates the active mode (e.g., "Public Mode Active"). In addition, graphical user interface 500 may include one or more controls and/or other elements (not shown) enabling a user of graphical user interface 500 and/or vehicle computing platform 110 to view more details about the privacy mode, activate or de-activate a privacy mode, change a privacy mode, change settings, or the like.

Figure 6:
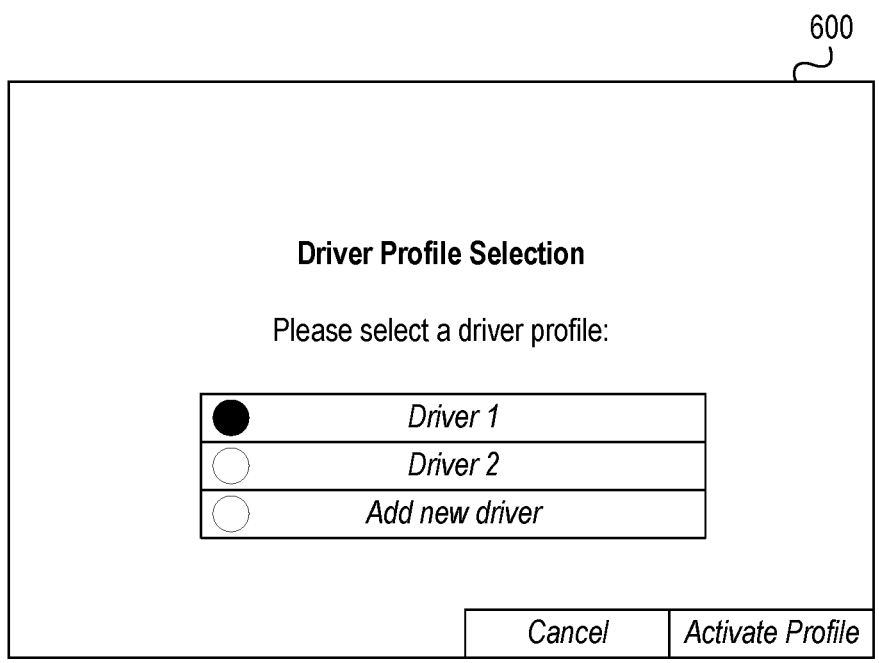

FIG. 6 depicts an illustrative example graphical user interface for preventing unauthorized access to secured information using identification techniques in accordance with one or more example embodiments. For example, vehicle computing platform 110 may display and/or otherwise present a graphical user interface similar to graphical user interface 600, which is illustrated in FIG. 6. As seen in FIG. 6, graphical user interface 600 may be a screen that is shown that allows for selection of a driver profile. One or more driver profiles may be stored by vehicle computing platform 110. A driver profile may store information about a driver of the vehicle. For example, a driver profile may store identifying information (e.g., biometric information, a username, password, activation phrase, height, weight, images of the driver for use in facial recognition, audio information about the driver for use in voice recognition, and the like). A driver profile may include relationship information about the driver (e.g., information about the driver's family members, friends, co-workers, and the like). A driver profile may include driver preferences (e.g., a default privacy mode, information about what privacy mode to activate in what circumstance, what information to obscure or not obscure when in a particular privacy mode, and the like).

In addition, graphical user interface 600 may include one or more controls and/or other elements (not shown) enabling a user of graphical user interface 600 and/or vehicle computing platform 110 to create a new driver profile, update an existing driver profile, delete a driver profile, and the like.

Figure 7:
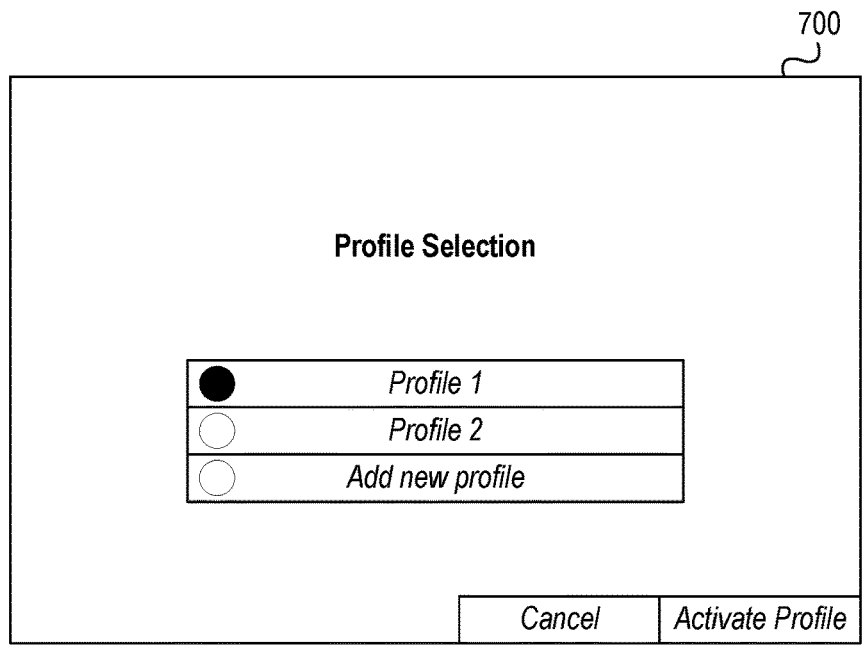

FIG. 7 depicts an illustrative example graphical user interface for preventing unauthorized access to secured information using identification techniques in accordance with one or more example embodiments. For example, vehicle computing platform 110 may display and/or otherwise present a graphical user interface similar to graphical user interface 700, which is illustrated in FIG. 7. As seen in FIG. 7, graphical user interface 700 may be a screen that is shown that allows for selection of a profile. One or more profiles may be stored by a computing system implementing features described herein. For example, an ATM may implement privacy profiles to protect information displayed to a user of the ATM. A profile may store information about a user of the system. For example, a profile may store identifying information (e.g., biometric information, a username, password, activation phrase, height, weight, images of the user for use in facial recognition, audio information about the user for use in voice recognition, and the like). A user profile may include relationship information about the user (e.g., information about the user's family members, friends, co-workers, and the like). A user profile may include user preferences (e.g., a default privacy mode, information about what privacy mode to activate in what circumstance, what information to obscure or not obscure when in a particular privacy mode, and the like). Thus, when using the system (e.g., an ATM), a particular privacy mode may be activated based on user preferences stored in the particular profile. For example, if a user uses an ATM alone or with a family member standing next to the user, the ATM—based on a private profile or family profile causing activation of a private mode or family mode—might not obscure any information on the screen of the ATM. But if the user uses an ATM with a co-worker standing near the user, the ATM—based on a co-worker mode being activated—may obscure some information on the screen of the ATM.

In addition, graphical user interface 700 may include one or more controls and/or other elements (not shown) enabling a user of graphical user interface 700 and/or vehicle computing platform 110 to create a new profile, update an existing profile, delete a profile, and the like.

Figure 8:
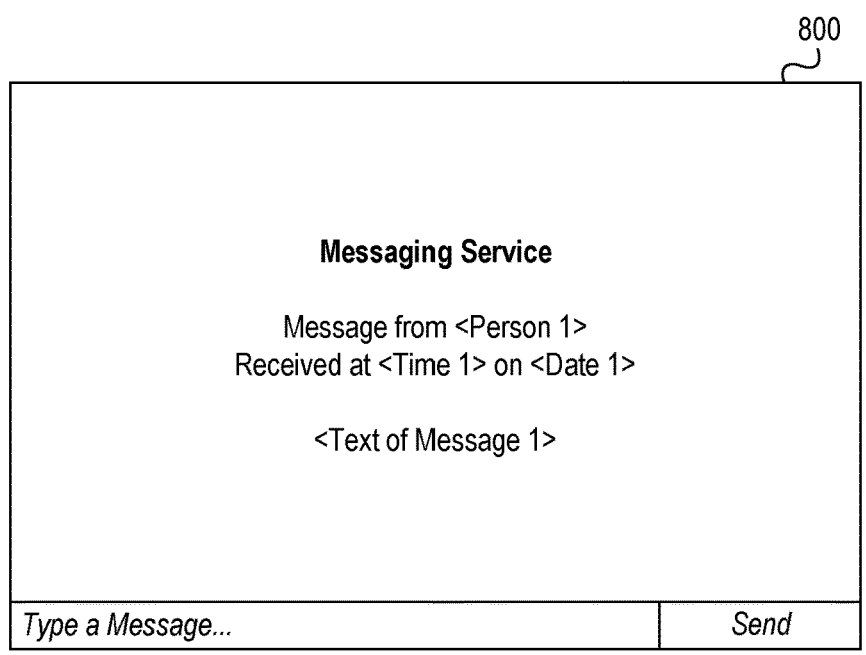

FIG. 8 depicts an illustrative example graphical user interface for preventing unauthorized access to secured information using identification techniques in accordance with one or more example embodiments. For example, vehicle computing platform 110 may display and/or otherwise present a graphical user interface similar to graphical user interface 800, which is illustrated in FIG. 8. As seen in FIG. 8, graphical user interface 800 may be a screen that is shown that allows for viewing and/or responding to messages. For example, graphical user interface 800 may show text or multimedia messages received on a computing device connected to vehicle computing platform 110. Based on a privacy mode that is active in the vehicle, more or less information may be displayed on the screen. For example, if the vehicle is in private mode, the entire content of the text message may be displayed. But if the vehicle is in public mode (e.g., based on a stranger riding in the vehicle, such as with a taxi or ride-sharing service), the screen might not show any information about the message, might only show that a message was received without showing the text of the message, or the information may otherwise be obscured.

In addition, graphical user interface 800 may include one or more controls and/or other elements enabling a user of graphical user interface 800 and/or vehicle computing platform 110 to respond to a message.

Figure 9A:
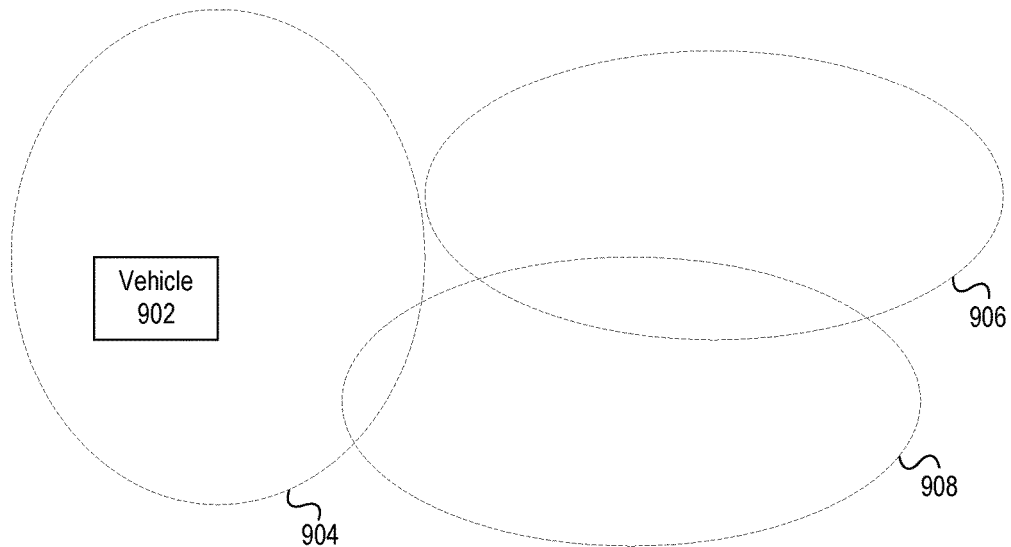
FIGS. 9A and 9B depict an illustrative example of using geolocation techniques for preventing unauthorized access to secured information in accordance with one or more example embodiments.
Figure 9B:
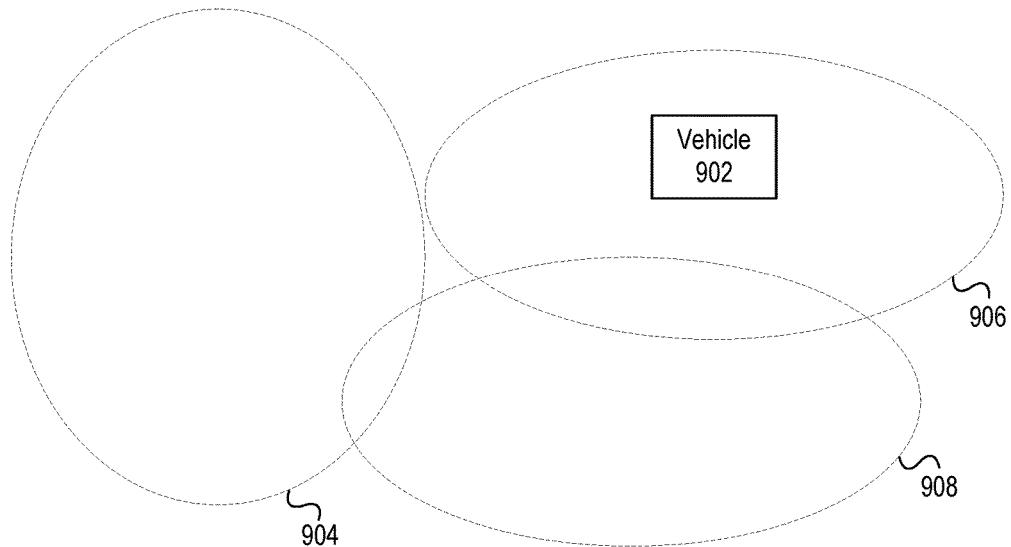

FIGS. 9A and 9B depict an illustrative example of using geolocation techniques for preventing unauthorized access to secured information in accordance with one or more example embodiments. For example, the system may, in some embodiments, determine a location of the vehicle, and select the information to be obscured on a screen of the vehicle based on the location of the vehicle.

Referring to FIG. 9A, geo-fence 904, geo-fence 906, and geo-fence 908 may be established. A geo-fence (e.g., geo-fence 904, geo-fence 906, geo-fence 908) may be a geographic area that is defined with a particular application or system. A particular privacy mode or privacy modes may be associated with one or more geo-fences. For example, geo-fence 904 may be associated with a family privacy mode, while geo-fence 908 may be associated with a work privacy mode. Some geo-fences might not be associated with a particular privacy mode.

The system may determine a location of the vehicle (e.g., vehicle 902). For example, determining a location of the vehicle may include determining that the location of the vehicle indicates that the vehicle is within a predetermined geo-fence of a plurality of predetermined geo-fences.

A default privacy mode may be selected and/or applied to a vehicle (e.g., a vehicle 902, which may include a vehicle computing platform, such as vehicle computing platform 110) based on a particular geo-fence. For example, when vehicle 902 is in geo-fence 904, the default privacy mode associated with geo-fence 904 may be activated for vehicle 902. Furthermore, in some embodiments, selecting the information to be obscured based on the location of the vehicle may include determining whether a profile associated with the predetermined geo-fence indicates that the information is to be obscured.

Referring to FIG. 9B, when vehicle 902 is in geo-fence 906, the default privacy mode associated with geo-fence 906 may be activated for vehicle 902. The default privacy mode associated with geo-fence 906 may be the same as or different from the default privacy mode associated with geo-fence 904. Thus, the privacy mode of a vehicle may automatically change based on a location of the vehicle.

Figure 10:
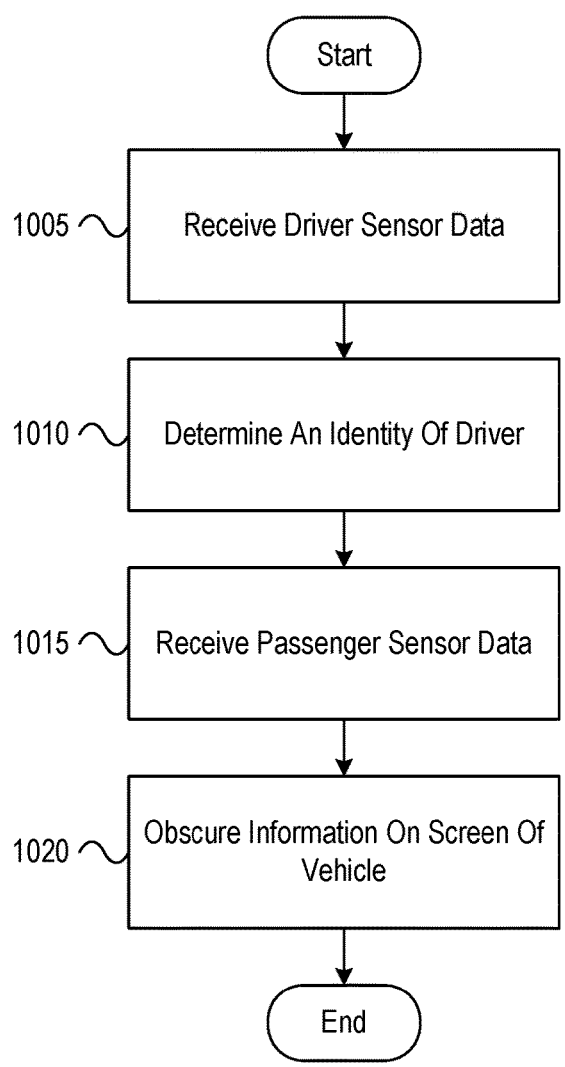
FIG. 10 depicts an illustrative method for preventing unauthorized access to secured information using identification techniques in accordance with one or more example embodiments.

FIG. 10 depicts an illustrative method for preventing unauthorized access to secured information using identification techniques in accordance with one or more example embodiments. Referring to FIG. 10, at step 1005, a computing platform having at least one processor, a memory, and a communication interface may receive driver sensor data indicating whether a driver seat in a vehicle is occupied. At step 1010, the computing platform may determine, based on the driver sensor data, an identity of a driver of the vehicle. At step 1015, the computing platform may receive passenger sensor data indicating whether a passenger seat in the vehicle is occupied. At step 1020, the computing platform may, based on the passenger sensor data indicating that the passenger seat in the vehicle is occupied, obscure information on a screen of the vehicle.

Figure 11:
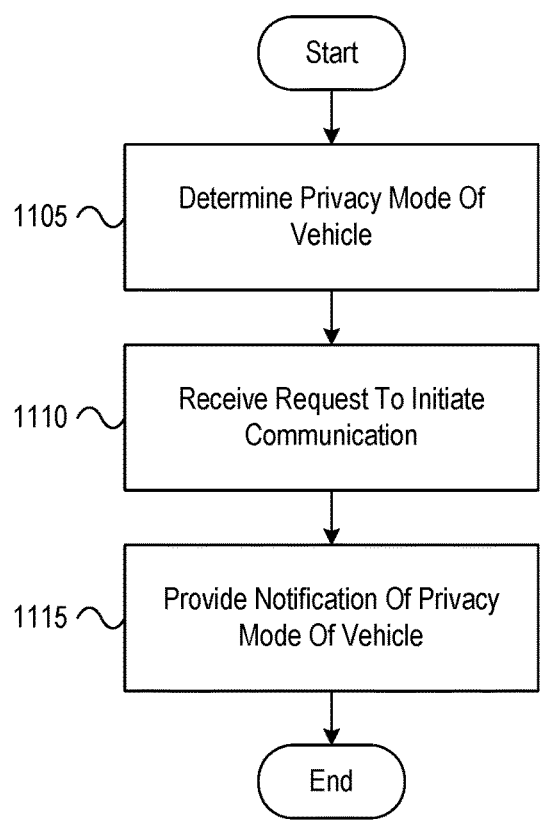
FIG. 11 depicts an illustrative method for preventing unauthorized access to secured information using identification techniques in accordance with one or more example embodiments.

FIG. 11 depicts an illustrative method for preventing unauthorized access to secured information using identification techniques in accordance with one or more example embodiments. Referring to FIG. 11, at step 1105, a computing platform having at least one processor, a memory, and a communication interface may determine a privacy mode of a vehicle, the privacy mode based on a first identity of the first vehicle occupant and a second identity of a second vehicle occupant. At step 1110, the computing platform may receive a request to initiate a communication between the computing platform and a device outside the vehicle. At step 1115, the computing platform may, before initiating the communication, provide a notification to the device outside the vehicle of a status of the privacy mode of the vehicle.

Figure 12:
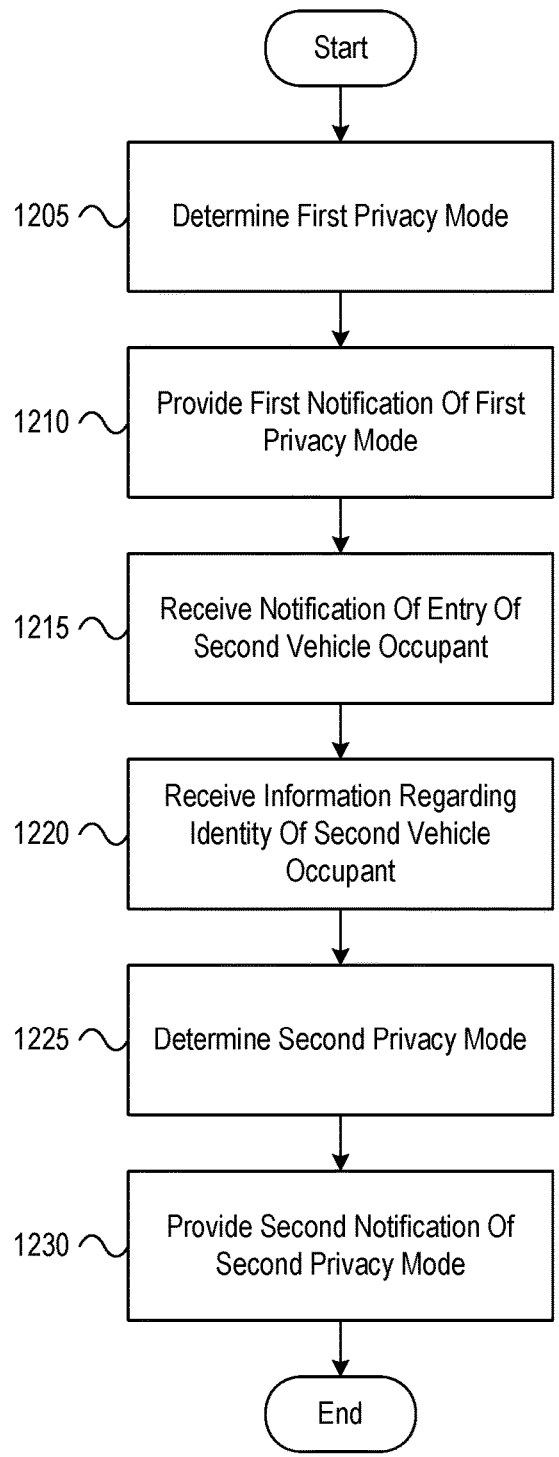
FIG. 12 depicts an illustrative method for preventing unauthorized access to secured information using identification techniques in accordance with one or more example embodiments.

FIG. 12 depicts an illustrative method for preventing unauthorized access to secured information using identification techniques in accordance with one or more example embodiments. Referring to FIG. 12, at step 1205, a computing platform having at least one processor, a memory, and a communication interface may determine a first privacy mode of a vehicle, the first privacy mode based on a first identity of the first vehicle occupant. At step 1210, the computing platform may provide a first notification of the first privacy mode of the vehicle. At step 1215, the computing platform may receive notification of an entry of a second vehicle occupant to the vehicle. At step 1220, the computing platform may receive information regarding a second identity of the second vehicle occupant. At step 1225, the computing platform may determine a second privacy mode of the vehicle, the second privacy mode based on the first identity of the first vehicle occupant and the second identity of the second vehicle occupant, the second privacy mode different from the first privacy mode. At step 1230, the computing platform may provide a second notification of the second privacy mode of the vehicle.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform associated with a first vehicle occupant, the computing platform comprising:
   at least one processor;
   a communication interface communicatively coupled to the at least one processor; and
   memory storing computer-readable instructions that, when executed by the at least one processor, cause the computing platform to:
      determine a privacy mode of a vehicle, the privacy mode based on a first identity of the first vehicle occupant and a second identity of a second vehicle occupant;
      receive a request to initiate a communication between the computing platform and a device outside the vehicle, wherein the request comprises a third identity of a user of the device outside the vehicle;
      before initiating the communication, provide an audio notification to the device outside the vehicle of a status of the privacy mode of the vehicle; and
      encrypt, based on the first identity of the first vehicle occupant, the second identity of the second vehicle occupant, and the third identity of the user of the device outside the vehicle, the communication between the computing platform and the device outside the vehicle.

2. The computing platform of claim 1, wherein receiving the request to initiate the communication between the computing platform and the device outside the vehicle comprises receiving a request to initiate a telephone call from the device outside the vehicle.

3. The computing platform of claim 2, wherein receiving the request to initiate the telephone call from the device outside the vehicle comprises receiving the telephone call from the device outside the vehicle.

4. The computing platform of claim 3, wherein the audio notification comprises including the status of the privacy mode of the vehicle.

5. The computing platform of claim 4, wherein the memory stores additional computer-readable instructions that, when executed by the at least one processor, cause the computing platform to:
   provide notification of the first identity of the first vehicle occupant and the second identity of the second vehicle occupant.

6. The computing platform of claim 5, wherein
   encrypting the communication from the device outside the vehicle comprises encrypting the telephone call.

7. The computing platform of claim 6, wherein the memory stores additional computer-readable instructions that, when executed by the at least one processor, cause the computing platform to:
   provide a notification that the telephone call is encrypted.

8. The computing platform of claim 7, wherein the privacy mode of the vehicle is a first privacy mode during a first time of day, and wherein the privacy mode of the vehicle is a second privacy mode during a second time of the day.

9. A method comprising:
at a computing platform associated with a first vehicle occupant, the computing platform comprising at least one processor, memory, and a communication interface:
determining, by the computing platform associated with a first vehicle occupant, a privacy mode of a vehicle, the privacy mode based on a first identity of the first vehicle occupant and a second identity of a second vehicle occupant;
receiving, by the computing platform, a request to initiate a communication between the computing platform and a device outside the vehicle;
receiving, a third identity of a user of the device outside the vehicle;
providing, before initiating the communication by the computing platform and to the device outside the vehicle, an audio notification of a status of the privacy mode of the vehicle; and
encrypting, based on the first identity of the first vehicle occupant, the second identity of the second vehicle occupant, and the third identity of the user of the device outside the vehicle, the communication between the computing platform and the device outside the vehicle.

10. The method of claim 9, wherein the privacy mode of the vehicle is a first privacy mode during a first time of day, and a second privacy mode during a second time of the day.

11. A computing platform associated with a first vehicle occupant, the computing platform comprising:
at least one processor;
a communication interface communicatively coupled to the at least one processor; and
memory storing computer-readable instructions that, when executed by the at least one processor, cause the computing platform to:
determine a first privacy mode of a vehicle, the first privacy mode based on a first identity of the first vehicle occupant;
provide a first vibration alert notification of corresponding to the first privacy mode of the vehicle;
receive notification of an entry of a second vehicle occupant to the vehicle;
receive information regarding a second identity of the second vehicle occupant;
determine a second privacy mode of the vehicle, the second privacy mode based on the first identity of the first vehicle occupant and the second identity of the second vehicle occupant, the second privacy mode different from the first privacy mode; and
provide a second vibration alert notification corresponding to the second privacy mode of the vehicle, wherein the second vibration alert notification is different than the first vibration alert notification.

12. The computing platform of claim 11, wherein the memory stores additional computer-readable instructions that, when executed by the at least one processor, cause the computing platform to:
cause, via a display of the computing platform, a visual indication of a current privacy mode of the vehicle.

13. The computing platform of claim 12, wherein the visual indication of the current privacy mode of the vehicle comprises a blinking indication corresponding to the current privacy mode of the vehicle.

14. The computing platform of claim 13, wherein the memory stores additional computer-readable instructions that, when executed by the at least one processor, cause the computing platform to:
receive input corresponding to a request to change the current privacy mode of the vehicle to a different privacy mode of the vehicle; and
send, to the vehicle, the request to change the current privacy mode of the vehicle to the different privacy mode.

15. The computing platform of claim 14, wherein receiving the input corresponding to the request to change the current privacy mode of the vehicle to the different privacy mode of the vehicle comprises receiving, via a touch-screen interface, a tap input corresponding to the request to change the current privacy mode of the vehicle to the different privacy mode of the vehicle.

16. The computing platform of claim 15, wherein the memory stores additional computer-readable instructions that, when executed by the at least one processor, cause the computing platform to:
activate a first mode of the computing platform based on the second vehicle occupant having a first relationship with respect to the first vehicle occupant; and
activate a second mode of the computing platform based on the second vehicle occupant having a second relationship with respect to the first vehicle occupant, the second mode of the computing platform different from the first mode of the computing platform.

17. The computing platform of claim 16, wherein the memory stores additional computer-readable instructions that, when executed by the at least one processor, cause the computing platform to:
if the first mode of the computing platform is active, provide a first type of alert corresponding to the current privacy mode of the vehicle; and
if the second mode of the computing platform is active, provide a second type of alert corresponding to the current privacy mode of the vehicle, the second type of alert different from the first type of alert.

18. The computing platform of claim 17, wherein the computing platform is part of a watch.

19. The computing platform of claim 18, wherein the watch is configured to communicate wirelessly with the vehicle.

20. The computing platform of claim 11, wherein at least one of the first vibration alert or the second vibration alert comprises a visual indication of the privacy mode of the vehicle.

* * * * *

UNITED STATES PATENT AND TRADEMARK OFFICE
CERTIFICATE OF CORRECTION

| | |
|---|---|
| PATENT NO. | : 10,474,800 B2 |
| APPLICATION NO. | : 15/353718 |
| DATED | : November 12, 2019 |
| INVENTOR(S) | : Kurian |

It is certified that error appears in the above-identified patent and that said Letters Patent is hereby corrected as shown below:

In the Claims

Column 25, Line 46:
In Claim 11, after "notification", delete "of"

Signed and Sealed this
Nineteenth Day of January, 2021

Andrei Iancu
*Director of the United States Patent and Trademark Office*